US006085964A

United States Patent [19]

[11] Patent Number: 6,085,964

Hojo et al.

[45] Date of Patent: Jul. 11, 2000

[54] METHOD OF SEALING A HOLE

[75] Inventors: Tsukasa Hojo; Ryuji Otani; Toru Kuwata; Shusuke Matsumura, all of Osaka, Japan

[73] Assignee: Matasushita Electric Works, Ltd., Osaka, Japan

[21] Appl. No.: 09/144,347

[22] Filed: Aug. 31, 1998

Related U.S. Application Data

[62] Division of application No. 08/864,685, May 28, 1997.

[30] Foreign Application Priority Data

May 28, 1996 [JP] Japan .................................... 8-133056

[51] Int. Cl.$^{7}$ ........................... B21D 39/00; B21D 39/04; B23K 31/02; B23K 1/00; B23K 5/00

[52] U.S. Cl. ............................. 228/164; 228/60; 228/127

[58] Field of Search .................................... 228/196, 165, 228/157, 60, 127, 184, 164; 200/302.1

[56] References Cited

U.S. PATENT DOCUMENTS

| | | | |
|---|---|---|---|
| 3,891,821 | 6/1975 | Evertz | 219/76 |
| 4,017,960 | 4/1977 | Kawabe et al. | 29/401 E |
| 4,090,657 | 5/1978 | Anderson | 228/119 |
| 4,309,816 | 1/1982 | Takeyama et al. | 29/622 |
| 4,342,553 | 8/1982 | Graff et al. | 431/358 |
| 4,493,451 | 1/1985 | Clark et al. | 228/119 |
| 5,318,213 | 6/1994 | Strickland et al. | 228/107 |

FOREIGN PATENT DOCUMENTS

| | | | |
|---|---|---|---|
| 528457 | 4/1993 | Japan | H01H 33/64 |

*Primary Examiner*—Patrick Ryan
*Assistant Examiner*—Zidia Pittman
*Attorney, Agent, or Firm*—Sughrue, Mion, Zinn, Macpeak & Seas, PLLC

[57] ABSTRACT

A configuration for forming a gastight space is prevented from being projected from a housing, so that a projection is not formed on the housing. A sealed contact device includes a housing including a container body having an opening end portion, the container body being made of ceramics, a metal lid connected to the opening end portion to form a gastight space, a stationary contact and a movable contact disposed in the container body, and a sealed vent portion formed in the metal lid, in which the sealed vent portion is formed by sealing a vent hole formed in the metal lid after exhausting a gas in the gastight space and supplying a desired gas into the gastight space, via the vent hole.

4 Claims, 23 Drawing Sheets

METHOD OF SEALING A HOLE

This is a divisional of application Ser. No. 08/864,685 filed May 28, 1997, the disclosure of which is incorporated herein by reference.

BACKGROUND OF THE INVENTION

1. Field of the Invention

This invention relates mainly to a sealed contact device in which a stationary contact and a movable contact are disposed in a housing having a gastight space, a method of producing the sealed contact device, and a sealing method, and particularly to a technique in which a configuration for forming a gastight space is prevented from being projected from the housing, so that a projection is not formed on the housing.

2. Background

Conventionally, a sealed contact device Aa in which a stationary contact 2 and a movable contact 3 are disposed in a housing 1 having a gastight space E is configured as disclosed in Japanese Patent Publication No. Hei. 5-28457 shown in FIG. 35. A vent pipe 7*a* is projected from the housing 1, the interior of the housing 1 is evacuated or a gas is introduced into the housing via the vent pipe 7*a,* and the vent pipe 7*a* is then compressed so as to be sealed.

In this configuration, since the vent pipe 7*a* is used, the vent pipe 7*a* is projected from the housing 1. Therefore, the vent pipe 7*a* causes much cumber in installation, package; storage, and the like of the sealed contact device Aa.

SUMMARY OF THE INVENTION

With the above problem in view, it is an object of this invention to provide a sealed contact device, a method of producing the sealed contact device, and a sealing method in which a configuration for forming a gastight space is prevented from being projected from a housing, so that a projection is not formed on the housing.

The first aspect of the invention is a sealed contact device in which a stationary contact and a movable contact are disposed in a housing having a gastight space, a metal lid is joined in a gastight manner to an opening end of a container body, the housing including the container body made of ceramics, a vent hole is formed in the metal lid, and the vent hole is sealed.

The second aspect of the invention is a sealed contact device in which a stationary contact and a movable contact are disposed in a housing having a gastight space, a vent hole is formed in an electrode, the stationary contact being disposed on the electrode, the electrode being extended to an outside of the housing, and the vent hole is sealed.

The third aspect of the invention is a sealed contact device in which a stationary contact and a movable contact are disposed in a housing having a gastight space, the device includes a movable shaft, the movable contact being disposed on the movable shaft, the movable shaft being extended to an outside of the housing and movable, a vent hole is formed in the movable shaft, and the vent hole is sealed.

The fourth aspect of the invention is a sealed contact device in which a stationary contact and a movable contact are disposed in a housing having a gastight space, wherein a vent hole is formed in a container body, the housing including the container body made of ceramics, and the vent hole is sealed.

In the fifth aspect of the invention, the sealed contact device of the first aspect of the invention is configured so that a metal portion of the opening end of the container body, and the metal lid are made of a metal material which is similar in coefficient of linear expansion to the container body.

The sixth aspect of the invention is a method of producing a sealed contact device in which a stationary contact and a movable contact are disposed in a housing having a gastight space, a metal lid is joined in a gastight manner to an opening end of a container body, the housing including the container body made of ceramics, a vent hole is formed in the metal lid, a gas is supplied and exhausted via the vent hole, and a periphery of the hole is then melted and the vent hole is closed by a molten metal, thereby sealing the hole.

The seventh aspect of the invention is a method of producing a sealed contact device in which a stationary contact and a movable contact are disposed in a housing having a gastight space, a vent hole is formed in an electrode, the stationary contact being disposed on the electrode, the electrode being extended to an outside of the housing, a gas is supplied and exhausted via the vent hole, and a periphery of the hole is then melted and the vent hole is closed by a molten metal, thereby sealing the hole.

The eighth aspect of the invention is a method of producing a sealed contact device in which a stationary contact and a movable contact are disposed in a housing having a gastight space, wherein the device includes a movable shaft, the movable contact being disposed on the movable shaft, the movable shaft being extended to an outside of the housing and movable, a vent hole is formed in the movable shaft, a gas is supplied and exhausted via the vent hole, and a periphery of the hole is then melted and the vent hole is closed by a molten metal, thereby sealing the hole.

The ninth aspect of the invention is a method of producing a sealed contact device in which a stationary contact and a movable contact are disposed in a housing having a gastight space, wherein a metal lid is joined in a gastight manner to an opening end of a container body, the housing including the container body made of ceramics, a vent hole is formed in the metal lid, a further metal member having no hole is attached to the vent hole, and the metal member is melted to close the vent hole, thereby sealing the hole.

The tenth aspect of the invention is a method of producing a sealed contact device in which a stationary contact and a movable contact are disposed in a housing having a gastight space, a vent hole is formed in an electrode, the stationary contact being disposed on the electrode, the electrode being extended to an outside of the housing, a further metal member having no hole is attached to the vent hole, and the metal member is melted to close the vent hole, thereby sealing the hole.

The eleventh aspect of the invention is a method of producing a sealed contact device in which a stationary contact and a movable contact are disposed in a housing having a gastight space, the device includes a movable shaft, the movable contact being disposed on the movable shaft, the movable shaft being extended to an outside of the housing and movable, a vent hole is formed in the movable shaft, a further metal member having no hole is attached to the vent hole, and the metal member is melted to close the vent hole, thereby sealing the hole.

The twelfth aspect of the invention is a method of producing a sealed contact device in which a stationary contact and a movable contact are disposed in a housing having a gastight space, a vent hole is formed in a container body, the housing including the container body made of ceramics, a further metal member having no hole is attached to the vent hole, and the metal member is melted to close the vent hole, thereby sealing the hole.

In the thirteenth aspect of the invention, the method of producing a sealed contact device of any one of the sixth to eighth aspects of the invention is configured so that a projection is formed by a working method which is not a removal working method, to form the vent hole, a gas is supplied and exhausted via the vent hole, and the projection in the vicinity of the hole is then melted and the vent hole is closed by a molten metal, thereby sealing the hole.

In the fourteenth aspect of the invention, the method of producing a sealed contact device of any one of the sixth to eighth aspects of the invention is configured so that a raised piece is deformed to close the vent hole, and a periphery of the hole which has been reduced in size is then melted by heating, thereby sealing the hole.

In the fifteenth aspect of the invention, the method of producing a sealed contact device of the fourteenth aspect of the invention is configured so that the raised piece is formed on an inner side of the container body, thereby forming the vent hole, a gas is supplied and exhausted, a root portion of the raised piece is locally heated to deform a part of the raised piece to close the vent hole, and a remaining portion of a periphery of the hole is then melted by heating, thereby sealing the hole.

In the sixteenth aspect of the invention, the method of producing a sealed contact device of the fifteenth aspect of the invention is configured so that a parallel portion which is substantially parallel with the metal lid is formed in the raised piece, and the parallel portion is pressed to make the parallel portion thinner than another portion of the raised piece, whereby a width of the parallel portion is increased to form an overlapping portion when the raised piece is returned to an original position.

In the seventeenth aspect of the invention, the method of producing a sealed contact device of the fifteenth aspect of the invention is configured so that, in order to reduce a degree of projection of the raised piece toward an inner side of the container body, a periphery of the hole where the raised piece is formed, is projected toward an outside of the container body.

In the eighteenth aspect of the invention, the method of producing a sealed contact device of any one of the sixth to eighth aspects of the invention is configured so that the vent hole is formed in a slanting direction with respect to a thickness direction of the metal lid, and a periphery of the vent hole is welded, thereby sealing the hole.

In the nineteenth aspect of the invention, the method of producing a sealed contact device of any one of the sixth to eighth aspects of the invention is configured so that a peripheral portion of the vent hole is thinned, a gas is supplied and exhausted via the vent hole, and a periphery of the vent hole is then melted by heating, thereby sealing the hole.

In the twentieth aspect of the invention, the method of producing a sealed contact device of any one of the sixth to eighth aspects of the invention is configured so that the vent hole is formed by leaving a part of a portion where a metal portion of the opening end of the container body and the metal lid are to be joined to each other, as a slit-like shape, a gas is supplied and exhausted via the vent hole, and a periphery of the vent hole is then melted by heating along the slit-like shape, thereby sealing the hole.

In the twenty-first aspect of the invention, the method of producing a sealed contact device of any one of the sixth to eighth aspects of the invention is configured so that the vent hole is formed by forming many pores in the metal lid, a gas is supplied and exhausted via the vent hole 7, and the pores are then melted by heating, thereby sealing the hole.

In the twenty-second aspect of the invention, the method of producing a sealed contact device of the twenty-first aspect of the invention is configured so that a plug part having many grooves on a peripheral wall is inserted into an opening of the metal lid, the grooves cooperating with the metal lid to form the pores, thereby forming the vent hole, a gas is supplied and exhausted via the vent hole, and the plug part is then melted by heating to be welded to the metal lid, thereby sealing the vent hole.

In the twenty-third aspect of the invention, the method of producing a sealed contact device of any one of the sixth to eighth aspects of the invention is configured so that the sealed contact device is housed in a chamber, a gas is supplied to and exhausted from an interior of the chamber, and the vent hole is then sealed.

In the twenty-fourth aspect of the invention, the method of producing a sealed contact device of any one of the sixth to eighth aspects of the invention is configured so that a port member is detachably attached in a gastight manner to the metal lid in which the vent hole is formed, a gas is supplied and exhausted via the port member, and the vent hole is then sealed.

In the twenty-fifth aspect of the invention, the method of producing a sealed contact device of any one of the ninth to twelfth aspects of the invention is configured so that the vent hole is sealed in a gastight manner by a metal member having a shape which allows the metal member to be fitted into the vent hole.

In the twenty-sixth aspect of the invention, the method of producing a sealed contact device of the twenty-fifth aspect of the invention is configured so that a projection in which a gap or groove is formed, is formed on a plug, one end portion of the projection of the plug is fitted into the vent hole formed in the metal lid, thereby allowing the vent hole to remain in a periphery of the gap or groove, evacuation is conducted or a gas is filled via the vent hole, and the vent hole is sealed by heating.

In the twenty-seventh aspect of the invention, the method of producing a sealed contact device of any one of the ninth to twelfth aspects of the invention is configured so that a projection is formed on a rear face of a plug, one end portion of the projection of the plug is placed on an edge portion of an opening which is formed in the metal lid, the plug is fixed to an edge portion of the opening on a side which is opposite to a side where the projection is placed, thereby forming the vent hole in a portion of the opening between the plug and the metal lid, evacuation is conducted or a gas is filled via the vent hole, and a portion of the projection which is placed on the metal lid is melted by heating, whereby the plug is caused to abut against a peripheral portion of the opening and to be welded by heating to the metal lid.

In the twenty-eighth aspect of the invention, the method of producing a sealed contact device of any one of the ninth to twelfth aspects of the invention is configured so that plural plugs are separably connected via separation pieces, the vent hole of the metal lid is sealed by one of the plugs, and, at the same time with or after this sealing, the plug is separated from other plugs at corresponding one of the separation pieces.

In the twenty-ninth aspect of the invention, the method of producing a sealed contact device of any one of the ninth to twelfth aspects of the invention is configured so that a brazing material is deposited on at least one of a periphery of the vent hole of the metal lid and a surface of a plug, and, after gas supply and exhaust or gas introduction via the vent hole, the metal lid and the plug are closely contacted to each other and heated to a temperature which is equal to or higher than a melting point of the brazing material, thereby sealing the hole by brazing.

In the thirtieth aspect of the invention, the method of producing a sealed contact device of any one of the ninth to twelfth aspects of the invention is configured so that a plug is provisionally fixed in a chamber to a degree at which gastightness can be maintained for a short time, the chamber being able to be subjected to evacuation, gas introduction, or the like, the device is then taken out from the chamber, and the plug is welded in a gastight manner.

The thirty-first aspect of the invention is a method of sealing a vent hole which is formed in a metal plate, a raised piece is deformed to close the vent hole, and a periphery of the hole which has been reduced in size is then melted by heating, thereby sealing the hole.

In the thirty-second aspect of the invention, the method of the thirty-first aspect is configured so that a root portion of the raised piece is locally heated to deform a portion of the raised piece by thermal distortion to close the vent hole, and a remaining portion of a periphery of the hole is then melted by heating, thereby sealing the hole.

In the thirty-third aspect of the invention, the method of the thirty-second aspect is configured so that a metal portion in a periphery of the raised piece is projected upwardly.

According to the first aspect of the invention, the vent hole is sealed and there is no member projected from the metal lid. Therefore, the configuration for forming the gastight space is prevented from being projected from the housing. Furthermore, the vent hole is formed in the metal lid, and hence the flat metal lid can be effectively used.

According to the second aspect of the invention, the vent hole is sealed and there is no member projected from the metal lid. Therefore, the configuration for forming the gastight space is prevented from being projected from the housing. Furthermore, the vent hole is formed in the electrode, and hence the electrode can be effectively used.

According to the third aspect of the invention, the vent hole is sealed and there is no member projected from the metal lid. Therefore, the configuration for forming the gastight space is prevented from being projected from the housing. Furthermore, the vent hole is formed in the movable shaft, and hence the movable shaft can be effectively used.

According to the fourth aspect of the invention, the vent hole is sealed and there is no member projected from the metal lid. Therefore, the configuration for forming the gastight space is prevented from being projected from the housing. Furthermore, the vent hole is formed in the container body, and hence the container body can be effectively used.

According to the fifth aspect of the invention, when a metal material of a small coefficient of linear expansion, such as 42-alloy is used in a metal portion such as an upper flange, the difference in coefficient of linear expansion between the metal portion and the container body is small, and therefore crack, deformation, and the like due to thermal effects in brazing can be reduced. When a material (for example, 42-alloy) which is similar in coefficient of linear expansion to a metal portion such as the container body and the upper flange is used in the metal lid, the gastight joint between a metal portion such as the upper flange and the metal lid can be easily realized.

According to the sixth aspect of the invention, the vent hole of the metal lid is sealed by melting the hole itself, and hence no special part for sealing is required.

According to the seventh aspect of the invention, the vent hole of the electrode is sealed by melting the hole itself, and hence no special part for sealing is required.

According to the eighth aspect of the invention, the vent hole of the electrode is sealed by melting the hole itself, and hence no special part for sealing is required.

According to the ninth aspect of the invention, even when the vent hole which is formed in the metal lid and used for supplying or exhausting a gas is relatively large, gastight sealing can be easily realized. Therefore, the time required for evacuation can be shortened and the productivity of the gastight sealing step can be improved.

According to the tenth aspect of the invention, even when the vent hole which is formed in the electrode and used for supplying or exhausting a gas is relatively large, gastight sealing can be easily realized. Therefore, the time required for evacuation can be shortened and the productivity of the gastight sealing step can be improved.

According to the eleventh aspect of the invention, even when the vent hole which is formed in the movable shaft and used for supplying or exhausting a gas is relatively large, gastight sealing can be easily realized. Therefore, the time required for evacuation can be shortened and the productivity of the gastight sealing step can be improved.

According to the twelfth aspect of the invention, even when the vent hole which is formed in the container body and used for supplying or exhausting a gas is relatively large, gastight sealing can be easily realized. Therefore, the time required for evacuation can be shortened and the productivity of the gastight sealing step can be improved.

According to the thirteenth aspect of the invention, the projection of the vent hole is melted by heating, and hence padding can be sufficiently formed. This is advantageous for gastight sealing.

According to the fourteenth aspect of the invention, the vent hole is formed by the raised piece. During evacuation and gas introduction, therefore, a large opening section area can be ensured, and hence the time required for evacuation and gas introduction can be shortened. Since the gap can be reduced in size by, for example, mechanically plastic-deforming the raised piece, the metal in the periphery of the vent hole can be melted by using a heat source such as a laser apparatus, with the result that the welding can be conducted so as to form a gastight configuration without additionally using a metal member.

According to the fifteenth aspect of the invention, the vent hole is formed by the raised piece. During evacuation and gas introduction, therefore, a large opening section area can be ensured, and hence the time required for evacuation and gas introduction can be shortened. The raised piece can be deformed in a noncontact manner by, for example, laser irradiation so as to reduce the size of the gap. The metal in the periphery of the hole can be melted by using a heat source such as a laser apparatus so as to form a gastight configuration without additionally using a metal.

According to the sixteenth aspect of the invention, the raised piece is pressed by, for example, a pressing machine so that the thickness is reduced and the width is increased to form the overlapping portion. When the root portion of the raised piece is locally heated by, for example, laser irradiation and contraction of the locally heated portion during cooling causes the raised piece to be deformed so as to reduce the size of the gap, the overlapping portion overlaps with the metal lid. Consequently, the welding for forming a gastight configuration can be easily conducted and the reliability of the welding is enhanced.

According to the seventeenth aspect of the invention, the raised piece is not projected from the lower face of a metal plate. When another part exists below the metal plate, for example, the raised piece is prevented from interfering with the part. The deformed portion which is projected functions as a rib so as to prevent the periphery from being deformed by welding distortion.

According to the eighteenth aspect of the invention, the vent hole slantingly passes through the metal lid. Even when irradiation from a heat source such as a laser apparatus is perpendicularly applied to the metal lid, therefore, gastight sealing can be easily realized.

According to the nineteenth aspect of the invention, the reduced thickness of the peripheral portion of the vent hole lowers the resistance exerted on air passing through the vent hole. Therefore, the interior of the container body can be easily evacuated and the time required for evacuation can be shortened.

According to the twentieth aspect of the invention, it is not necessary to form a hole in the metal lid and hence the step of forming a hole can be reduced. In the sealing step, it is possible to employ a process similar to that which is conducted in the previous step of joining the upper flange to the whole periphery of the metal lid.

According to the twenty-first aspect of the invention, since many pores are used, the vent hole can be easily sealed in a gastight manner after the operation of supplying and exhausting a gas and the reliability of the sealing is enhanced.

According to the twenty-second aspect of the invention, the vent hole is formed as pores by the separate plug member. As compared with the process of forming pores in the metal lid, therefore, the method can obtain the minute vent hole more easily and economically. When the grooves are arranged along the outer circumference of the plug member which is substantially conical, the plug member can be melted by heating with moving a heat source in a circle. Consequently, gastight sealing can be easily conducted.

According to the twenty-third aspect of the invention, since the sealed contact device is placed in a chamber, the possibility that an explosion due to mixture of a gas and air may occur during laser irradiation can be eliminated and hence the method is safer.

According to the twenty-fourth aspect of the invention, since gas supply and exhaust are conducted via the port member, the evacuation region can be made smaller. Therefore, the time required for supplying and exhausting a gas can be shortened and the productivity of the gastight sealing step can be improved.

According to the twenty-fifth aspect of the invention, the metal lid can be easily positioned with respect to the vent hole, and also the welding operation can be easily conducted.

According to the twenty-sixth aspect of the invention, the metal lid and the plug can be provisionally fixed to each other in advance. The subsequent steps do not require works of supplying,. chucking, and positioning of the plug, and the like, and require only relatively simple works of pressingly inserting the plug and then welding it. Therefore, the steps can be easily performed even in, for example, a chamber for gas introduction, and the productivity can be enhanced.

According to the twenty-seventh aspect of the invention, the metal lid and the plug can be provisionally fixed in advance with ensuring a gap therebetween. The subsequent steps do not involve works such as those of supplying, chucking, and positioning of the plug and require only noncontact works for conducting laser welding. Therefore, the steps can be easily performed even in, for example, a chamber for gas introduction, and the productivity can be enhanced.

According to the twenty-eighth aspect of the invention, the plugs are continuously supplied and the productivity of the gastight sealing step can be enhanced.

According to the twenty-ninth aspect of the invention, it is not required to conduct works such as those of supplying and applying a brazing material in the chamber for evacuation and gas introduction. Unlike the case where welding is conducted, the operation of positioning the plug and the heating portion does not require high accuracy, and hence the productivity of the gastight sealing step can be enhanced.

According to the thirtieth aspect of the invention, it is not required to conduct works such as those of supplying and applying a brazing material in the chamber for evacuation and gas introduction, and hence the safety and productivity of the gastight sealing step can be enhanced.

According to the thirty-first aspect of the invention, the raised piece which is raised up provides a high air permeability, and, when the raised piece is returned to its original position, the vent hole can be easily sealed by melting by using the raised piece. The vent hole cannot be seen from the raised piece in the heat melting direction. Also this configuration facilitates the melt sealing operation.

According to the thirty-second aspect of the invention, the vent hole is formed by a raised portion. During gas supply and exhaust, therefore, a large opening area can be ensured, and hence the time required for gas supply and exhaust and gas introduction can be shortened. Since the raised piece is deformed by using a heat source such as a laser apparatus, the handling of the device can be conducted without contacting with the metal lid. consequently, the method is very convenient for the use in a chamber of a vacuum or gas ambient. The configuration in which the gap is reduced in size by using a heat source such as a laser apparatus allows the gastight sealing operation to be easily conducted without using an additional member.

According to the thirty-third aspect of the invention, the raised piece is not projected from the lower face of a metal plate. When another part exists below the metal plate, for example, the raised piece is prevented from interfering with the part. The deformed portion which is projected functions as a rib so as to prevent the periphery from being deformed by welding distortion.

BRIEF DESCRIPTION OF THE DRAWINGS

FIG. 14*a* is a section view, FIG. 14*b* is a schematic perspective view, FIG. 14*c* is a section view, FIG. 14*d* is a schematic perspective view, FIG. 14*e* is a section view, and FIG. 14*f* is a schematic perspective view;

FIG. 15*a* is a section view, FIG. 15*b* is a schematic perspective view, FIG. 15*c* is a section view, FIG. 15*d* is a schematic perspective view, FIG. 15*e* is a section view, and FIG. 15*f* is a schematic perspective view;

FIG. 16*a* is a section view, FIG. 16*b* is a schematic perspective view, FIG. 16*c* is a perspective view as seen from the rear side, FIG. 16*d* is a section view, FIG. 16*e* is a schematic perspective view, FIG. 16*f* is a section view, FIG. 16*g* is a schematic perspective view, and FIG. 16*h* is a view illustrating a method of forming the vent hole;

FIGS. 17*a* and 17*b* are views illustrating formation and sealing, and FIGS. 17*c*, 17*d*, and 17*e* are perspective views;

FIG. 22*a* is a perspective view, FIG. 22*b* is a section view, FIG. 22*c* is a perspective view, FIG. 22*d* is a section view, FIG. 22*e* is a perspective view, and FIG. 22*f* is a section view;

FIG. 23*a* is an exploded perspective view, FIG. 23*b* is a section view of a metal lid, FIG. 23*c* is a perspective view showing a state where a vent hole is formed, and FIG. 23*d* is a section view;

FIG. 26*a* is a section view, FIG. 26*b* is a perspective view of a metal member, FIG. 26*c* is a section view, FIG. 26*d* is a perspective view of the metal member, FIG. 26*e* is a section view, and FIG. 26*f* is a perspective view of the metal member;

FIG. 27*a* is a perspective view of a plug, FIG. 27*b* is a section view showing formation of the vent hole, and FIG. 27*c* is a section view showing sealing of the vent hole;

FIG. 28*a* is an exploded perspective view, FIG. 28*b* is a perspective view showing formation of the vent hole, and FIG. 28*c* is a perspective view showing sealing of the vent hole;

FIGS. 32*a*, 32*b*, and 32*c* are views illustrating steps of forming and sealing a vent hole, and FIG. 32*d* is a schematic section view showing the whole;

FIGS. 33*a*, 33*b*, and 33*c* are views illustrating steps of forming and sealing a vent hole, and FIG. 33*d* is a schematic section view showing the whole;

FIGS. 34*a* and 34*b* are views illustrating formation and sealing, FIG. 34*c* is a perspective view, and FIG. 34*d* is a schematic section view showing the whole.

DETAILED DESCRIPTION OF THE PREFERRED EMBODIMENTS

Hereinafter, embodiments of the invention will be described with reference to the accompanying drawings.

Embodiment 1

Figure 1:
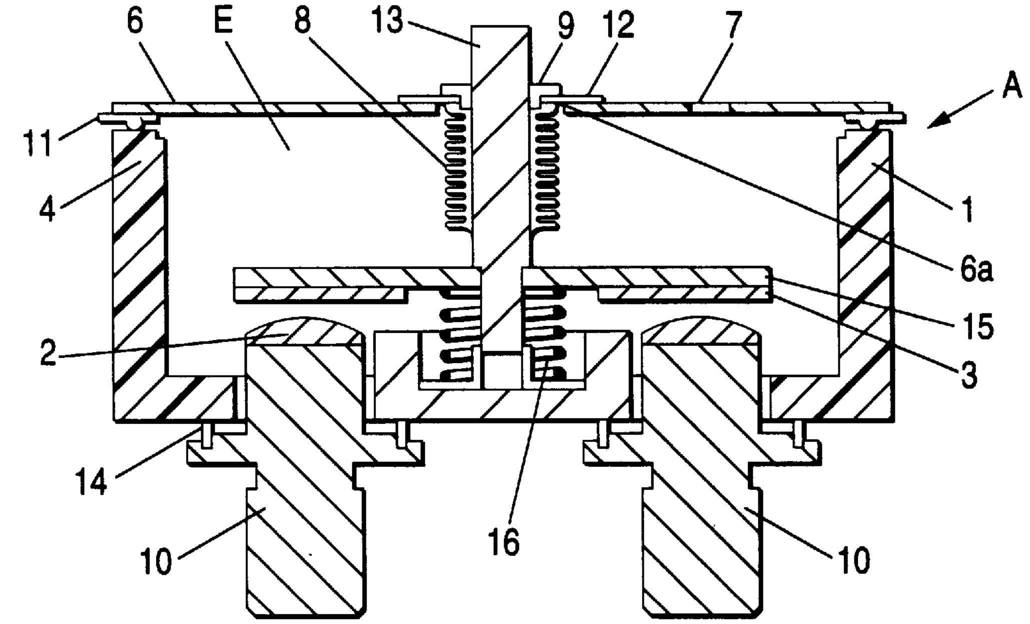
FIG. 1 is a section view of an embodiment according to a first aspect of the invention.
Figure 2:
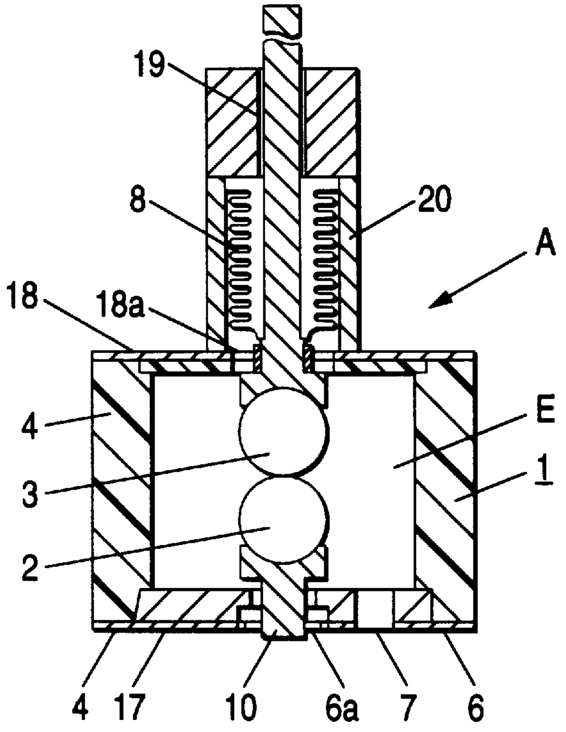
FIG. 2 is a section view of an embodiment according to the first aspect of the invention.

FIGS. 1 and 2 are section views of sealed contact devices A which show embodiments according to the first aspect of the invention.

As shown in FIG. 1, a housing 1 includes a container body 4 made of a heat resistant insulating material such as alumina ceramics and having a box-like shape in which one face is opened. Two stationary electrodes 10 are joined in a gastight manner to the bottom portion of the container body 4. A gastight space E is formed by the container body 4, the stationary electrodes 10, bellows 8, a metal lid 6 which is made of 42-alloy or the like and in which a through hole 6*a* is formed at the center and a vent hole 7 is formed at an appropriate position, a bellows presser 12 having a bearing 9, etc.

Specifically, the metal lid 6 is joined to the upper opening of the container body 4 so as to close the upper opening, via an upper flange 11 which is a metal portion. One end or the upper end portion of the bellows 8 is joined in a gastight manner to the metal lid 6 by clamping the end portion with the bellows presser 12, and the other end or the lower end portion of the bellows 8 is joined in a gastight manner to a movable shaft 13. In this way, the gastight space E is formed. After evacuation, the vent hole 7 is sealed. Depending on the kind of the sealed contact device A, in order to improve the contact performance, hydrogen or a gas mainly containing hydrogen may be filled at, for example, about 2 atmospheres into the space via the vent hole 7 prior to the sealing operation. The stationary electrodes 10 are made of, for example, a copper material and have a substantially multistage cylindrical shape. A stationary contact 2 is formed on the top of each of the electrodes 10. The stationary electrodes 10 are joined in a gastight manner via a lower flange 14 which is made of 42-alloy or the like. The reference numeral 15 designates a movable contacting element which is made of a copper material and which has a substantially flat plate-like shape. Movable contacts 3 are respectively fixed to the end portions of the movable contacting element 15, with being separated from each other by a distance at which the contacts can contact with and separate from the stationary contacts 2. The movable contacting element 15 is pressed against the stationary contacts 2 by a force which is exerted by an external driving unit (not shown) via the movable shaft 13. When the movable contacting element 15 is released from the driving force, the movable contacting element 15 is separated from the stationary contacts 2 by the action of a return spring 16.

As shown in FIG. 2, a housing 1 includes a container body 4 made of a heat resistant insulating material such as alumina ceramics and having a cylindrical shape. A bottom plate 17 which holds a stationary electrode 10 having a stationary contact 2 is joined in a gastight manner to the lower opening of the container body 4. The bottom plate serves as a metal lid 6 which is made of a metal material and in which a through hole 6*a* is formed at the center and a vent hole 7 is formed at an appropriate position. An upper plate 18 to which a bellows 8 is joined in a gastight manner, which is made of a metal material, and in which a through hole 18*a* is formed at the center is joined in a gastight manner to the upper opening of the container body 4. In this way, a gastight space E is formed in the housing 1.

Specifically, the bottom plate 17 which serves as the metal lid 6 is joined in a gastight manner to the lower opening of the container body 4, and the stationary electrode 10 is joined in a gastight manner to the bottom plate 17 at the through hole 6*a* which is formed at the center of the bottom plate 17. A through hole 18*a* into which a support member 19 configured as a part of a movable electrode is to be inserted is formed in the upper plate 18. A movable contact 3 is fixed to the end portion of the support member 19. One end or the upper end portion of the bellows 8 is joined in a gastight manner to a cylindrical member 20 which is joined in a gastight manner to the upper plate 18, and the other end or the lower end portion of the bellows is joined in a gastight manner to the support member 19. In this way, the gastight space E is formed. After evacuation, the vent hole 7 is sealed.

As described above, the metal lid 6 is joined in a gastight manner to the open end of the container body 4 of the housing 1, and the vent hole 7 is formed in the metal lid 6. Since the vent hole 7 is sealed and there is no member projected from the metal lid 6, the configuration for forming the gastight space E is prevented from being projected from the housing 1.

Embodiment 2

Figure 3:
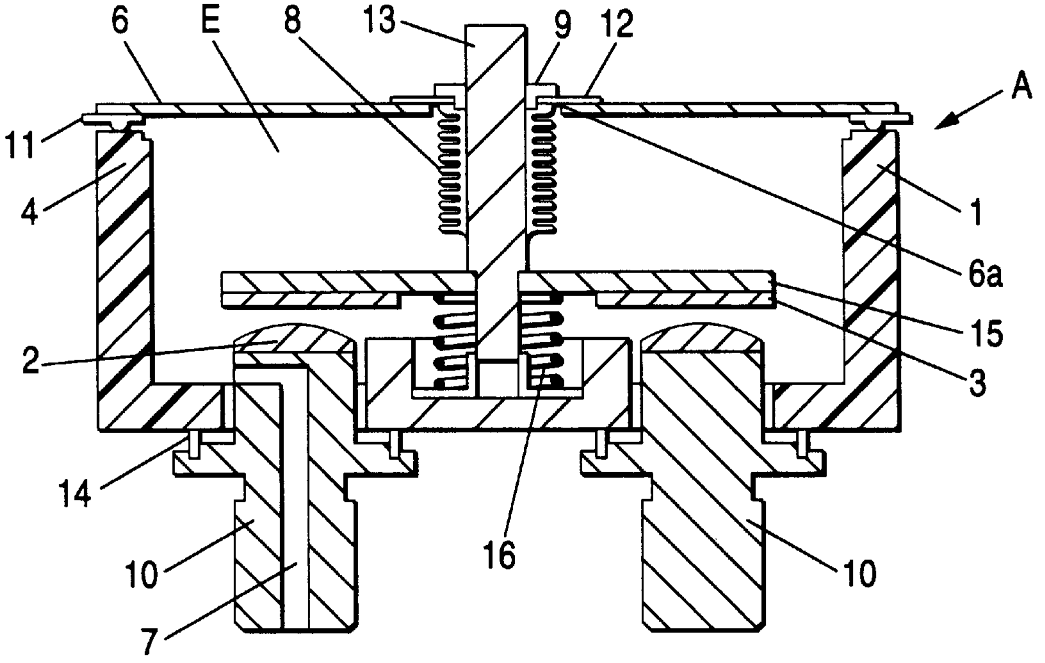
FIG. 3 is a section view of an embodiment according to a second aspect of the invention.
Figure 4:
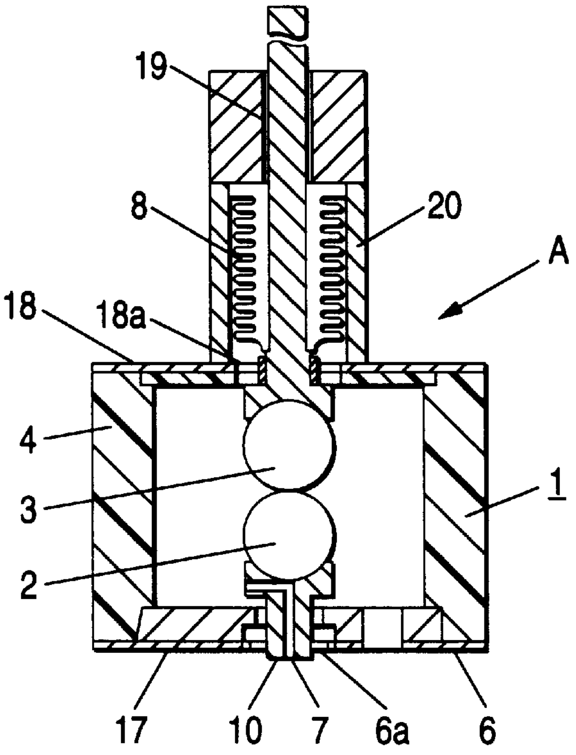
FIG. 4 is a section view of an embodiment according to the second aspect of the invention.

FIGS. 3 and 4 are section views of sealed contact devices A which show embodiments according to the second aspect of the invention.

As shown in FIG. 3, a housing 1 includes a container body 4 made of a heat resistant insulating material such as alumina ceramics and having a box-like shape in which one face is opened. Two stationary electrodes 10 are joined in a gastight manner to the bottom portion of the container body 4. One of the stationary electrodes 10 has a vent hole 7 at an appropriate portion. A gastight space E is formed by the container body 4, the stationary electrodes, a bellows 8, a metal lid 6 which is made of 42-alloy or the like, a bellows presser 12 having a bearing 9, etc. Specifically, the metal lid 6 is joined to the upper opening of the container body 4 so as to close the opening, via an upper flange 11 which is a metal portion. One end or the upper end portion of the bellows 8 is joined in a gastight manner to the metal lid 6 by clamping the end portion with the bellows presser 12, and the other end or the lower end portion of the bellows is joined in a gastight manner to a movable shaft 13. In this way, the gastight space E is formed. After evacuation, the vent hole 7 is sealed. Depending on the kind of the sealed contact device A, in order to improve the contact performance, hydrogen or a gas mainly containing hydrogen may be filled at, for example, about 2 atmospheres into the space via the vent hole 7 prior to the sealing operation. The stationary electrodes 10 are made of, for example, a copper material and have a substantially multistage cylindrical shape. A stationary contact 2 is formed on the top of each of the electrodes 10. The stationary electrodes 10 are joined in a gastight manner via a lower flange 14 which is made of 42-alloy or the like. The reference numeral 15 designates a movable contacting element which is made of a copper planar material and which is formed into a substantially flat plate-like shape. Movable contacts 3 are respectively fixed to the end portions of the movable contacting element 15, with being separated from each other by a distance at which the contacts can contact with and separate from the stationary contacts 2. The movable contacting element 15 is pressed against the stationary contacts 2 by a force which is exerted by an external driving unit (not shown) via the movable shaft 13. When the movable contacting element 15 is released from the driving force, the movable contacting element 15 is separated from the stationary contacts 2 by the action of a return spring 16.

As shown in FIG. 4, a container body 4 is made of a heat resistant insulating material such as alumina ceramics. A stationary electrode 10 in which a vent hole 7 is formed at an appropriate portion, and a bottom plate 17 which is made of a metal material such as 42-alloy and in which a through hole 6*a* is formed at the center are disposed in the lower opening of the container body 4. An upper plate 18 which is made of a metal material such as 42-alloy and in which a through hole 18*a* is formed at the center. The upper plate 18 with a bellows 8 are disposed in the upper opening of the container body 4. Specifically, the bottom plate 11 is joined in a gastight manner to the lower opening of the container body 4, and the stationary electrode 10 is joined in a gastight manner to the bottom plate 17 at the center through hole 6*a*. The upper plate 18 is joined in a gastight manner to the upper opening of the container body 4. A through hole 18*a* into which a support member 19 made of a copper material and configured as a part of a movable electrode is to be inserted is formed in the upper plate 18. One end or the upper end portion of the bellows 8 is joined in a gastight manner to a cylindrical member 20 which is joined in a gastight manner to the upper plate 18, and the other end or the lower end portion of the bellows 8 is joined in a gastight manner to the support member 19. In this way, a gastight space E is formed. After evacuation, the vent hole 7 is sealed.

Embodiment 3

Figure 5:
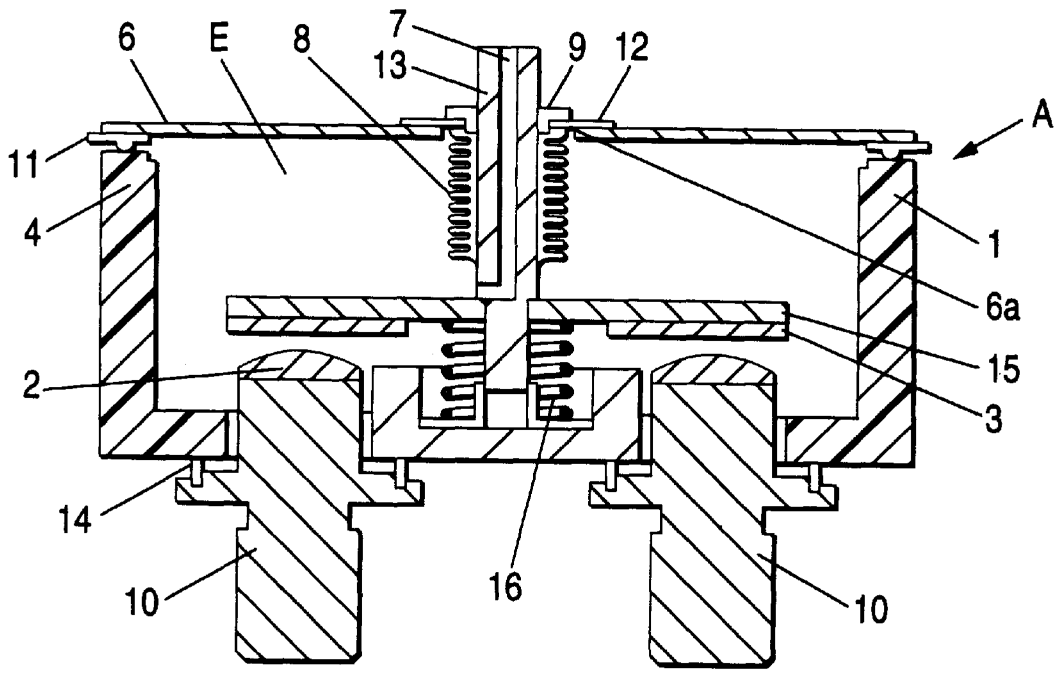
FIG. 5 is a section view of an embodiment according to a third aspect of the invention.

FIG. 5 is a section view of a sealed contact device A which is an embodiment according to the third aspect of the invention.

A housing 1 includes a container body 4 made of a heat resistant insulating material such as alumina ceramics and having a box-like shape in which one face is opened. Two stationary electrodes 10 are joined in a gastight manner to the bottom portion of the container body 4. A gastight space E is formed by the container body 4, the stationary electrodes 10, a bellows 8, a metal lid 6 which is made of 42-alloy or the like and in which a through hole 6*a* is formed at the center, a bellows presser 12 having a bearing 9, etc.

The metal lid 6 is joined to the upper opening of the container body 4 so as to close the opening, via an upper flange 11 which is a metal portion. One end or the upper end portion of the bellows 8 is joined in a gastight manner to the metal lid 6 by clamping the end portion with the bellows presser 12, and the other end or the lower end portion of the bellows 8 is joined in a gastight manner to a movable shaft 13 in which a vent hole 7 is formed at an appropriate portion. In this way, the gastight space E is formed. After evacuation, the vent hole 7 is sealed. Depending on the kind of the sealed contact device A, in order to improve the contact performance, hydrogen or a gas mainly containing hydrogen may be filled at, for example, about 2 atmospheres into the space via the vent hole 7 prior to the sealing operation. The stationary electrodes 10 are made of, for example, a copper material and has a substantially multistage cylindrical shape. A stationary contact 2 is formed on the top of each of the stationary electrodes 10. The stationary electrodes 10 are joined in a gastight manner via a lower flange 14 which is made of 42-alloy or the like. The reference numeral 15 designates a movable contacting element which is made of a copper material and which has a substantially flat plate-like shape. Movable contacts 3 are respectively fixed to the end portions of the movable contacting element 15, with being separated from each other by a distance at which the contacts can contact with and separate from the stationary contacts 2. The movable contacting element 15 is pressed against the stationary contacts 2 by a force which is exerted by an external driving unit (not shown) via the movable shaft 13 made of stainless steel. When the movable contacting element 15 is released from the driving force, the movable contacting element 15 is separated from the stationary contacts 2 by the action of a return spring 16.

The basic configurations of the first to third aspects of the invention may be realized by those shown in the figures of Embodiment 1 or modified in various manners.

Embodiment 4

Figure 6:
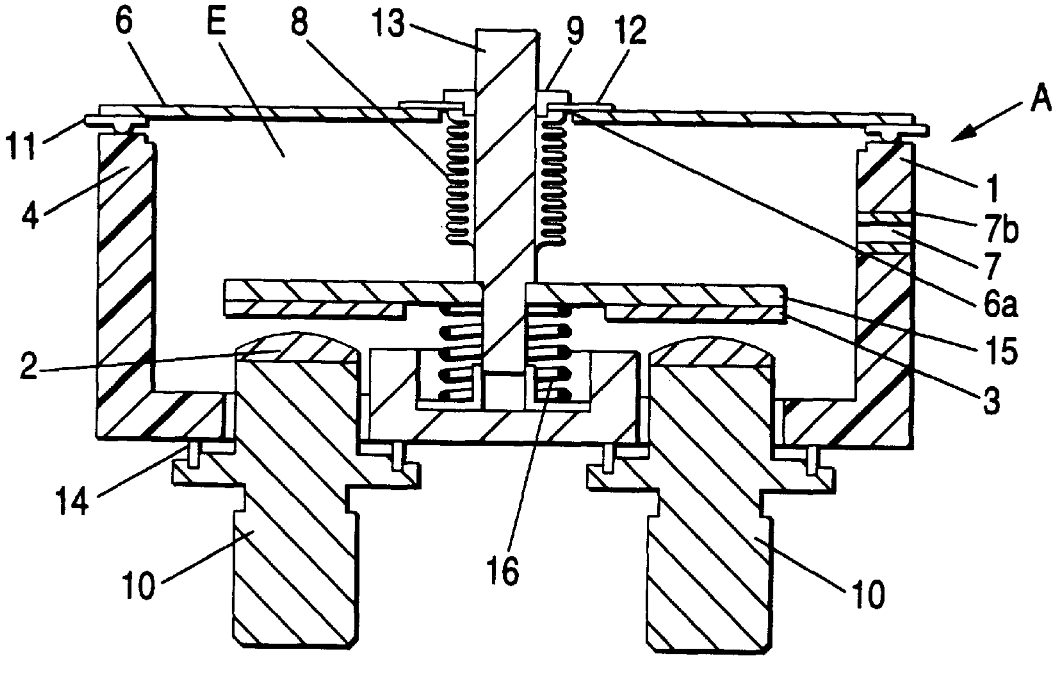
FIG. 6 is a section view of an embodiment according to a fourth aspect of the invention.
Figure 7:
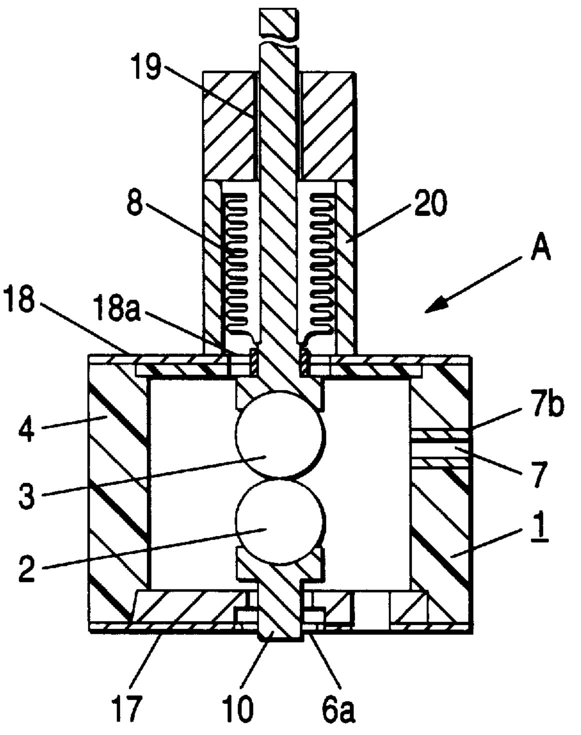
FIG. 7 is a section view of an embodiment according to the fourth aspect of the invention.

FIGS. 6 and 7 are section views of sealed contact devices A which are embodiments according to the fourth aspect of the invention.

Referring to FIG. 6, a housing 1 includes a container body 4 made of a heat resistant insulating material such as alumina ceramics and having a box-like shape in which one face is opened. Two stationary electrodes 10 are joined in a gastight manner to the bottom portion of the container body 4. A hole is opened at an appropriate portion of the container body 4. A metal member 7*b* having a hole is joined in a gastight manner to the hole, thereby forming a vent hole 7. A gastight space E is formed by the container body 4, the stationary electrodes 10, a bellows 8, a metal lid 6 which is made of 42-alloy or the like and in which a through hole 6*a* is formed at the center, a bellows presser 12 having a bearing 9, etc.

Specifically, the metal lid 6 is joined to the upper opening of the container body 4 so as to close the opening, via an upper flange 11 which is a metal portion. One end or the upper end portion of the bellows 8 is joined in a gastight manner to the metal lid 6 by clamping the end portion with the bellows presser 12, and the other end or the lower end portion of the bellows 8 is joined in a gastight manner to a movable shaft 13. In this way, the gastight space E is formed. After evacuation, the vent hole 7 is sealed. Depending on the kind of the sealed contact device A, in order to improve the contact performance, hydrogen or a gas mainly containing hydrogen may be filled at, for example, about 2 atmospheres into the space via the vent hole 7 prior to the sealing operation. The stationary electrodes 10 are made of, for example, a copper material and has a substantially multi-stage cylindrical shape. A stationary contact 2 is formed on the top of each of the electrodes. The stationary electrodes 10 are joined in a gastight manner via a lower flange 14 which is made of 42-alloy or the like. The reference numeral 15 designates a movable contacting element which is made of a copper planar material and which is formed into a substantially flat plate-like shape. Movable contacts 3 are respectively fixed to the end portions of the movable contacting element 15, with being separated from each other by a distance eat which the contacts can contact with and separate from the stationary contacts 2. The movable contacting element 15 is pressed against the stationary contacts 2 by a force which is exerted by an external driving unit (not shown) via the movable shaft 13. When the movable contacting element 15 is released the driving force, the movable contacting element 15 is separated from the stationary contacts 2 by the action of a return spring 16.

As shown in FIG. 7, a housing 1 includes a container body 4 made of a heat resistant insulating material such as alumina ceramics and having a cylindrical shape. A hole is opened at an appropriate portion of the container body 4. A metal member 7*b* having a hole is joined in a gastight manner to the hole, thereby forming a vent hole 7. A stationary electrode 10, and a bottom plate 17 which is made of a metal material and in which a through hole 6*a* is formed at the center are disposed in the lower opening of the container body 4. A bellows 8, and an upper plate 18 which is made of a metal material and in which a through hole 18*a* is formed at the center are disposed in the upper opening of the container body 4. Specifically, the bottom plate 17 is joined in a gastight manner to the lower opening of the container body 4, and the stationary electrode 10 is joined in a gastight manner to the bottom plate 17 at the center through hole 6*a* of the bottom plate 17. The upper plate 18 is joined in a gastight manner to the upper opening of the container body 4. A through hole 18*a* into which a support member 19 and configured as a part of a movable electrode is to be inserted is formed in the upper plate 18. One end or the upper end portion of the bellows 8 is joined in a gastight manner to a cylindrical member 20 which is joined in a gastight manner to the upper plate 18, and the other end or the lower end portion of the bellows is joined in a gastight manner to the support member 19. In this way, a gastight space E is formed. After evacuation, the vent hole 7 is sealed.

Embodiment 5

Figure 8:
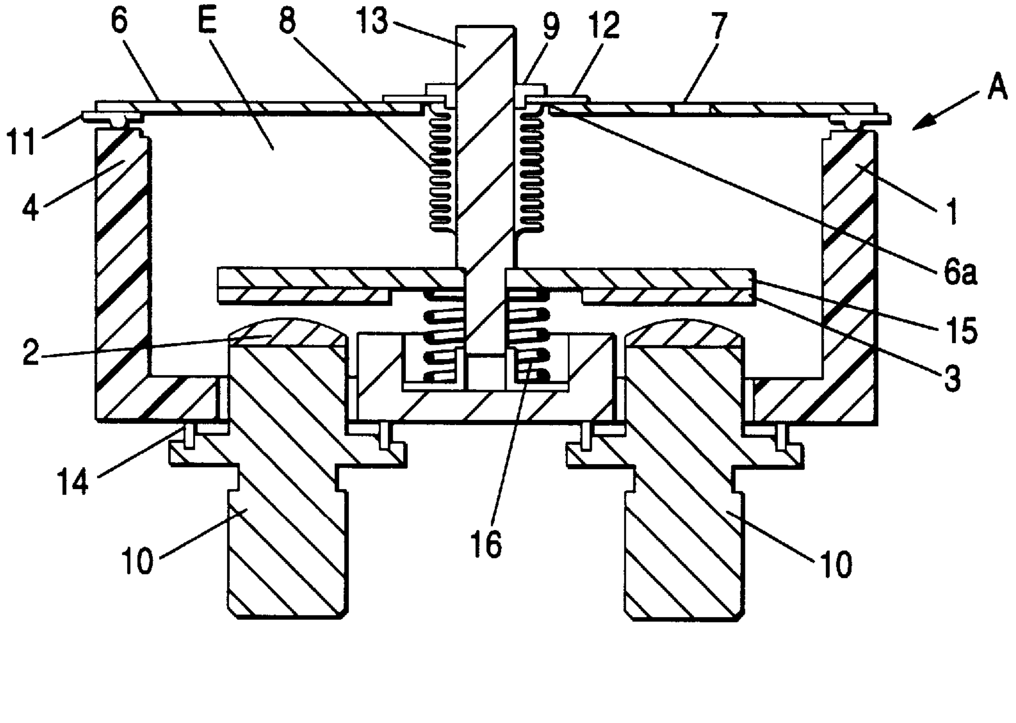
FIG. 8 is a section view of an embodiment according to a fifth aspect of the invention.

FIG. 8 shows an embodiment according to the fifth aspect of the invention. The basic configuration of the embodiment is identical with that of Embodiment 1. The identical components are designated by the same reference numerals, and their description is omitted. Hereinafter, an only device for sealing a vent hole 7 which is a feature of the embodiment will be described.

An upper flange 11 made of 42-alloy is formed by brazing or the like at the upper opening of the container body 4 made of a heat resistant insulating material such as ceramics and having a box-like shape. A metal lid 6 in which a vent hole 7 is opened at an appropriate portion is joined in a gastight manner to an upper portion of the upper flange 11. When a metal material of a small coefficient of linear expansion, such as 42-alloy is used in the upper flange 11, the difference in coefficient of linear expansion between the upper flange 11 and the container body 4 is small, and therefore crack, deformation, and the like due to thermal effects in brazing can be reduced. When a material (for example, 42-alloy) which is similar in coefficient of linear expansion to the container body 4 and the upper flange 11 is used in the metal lid 6, the gastight joint between the upper flange 11 and the metal lid 6 can be easily realized.

Embodiment 6

Figure 9:
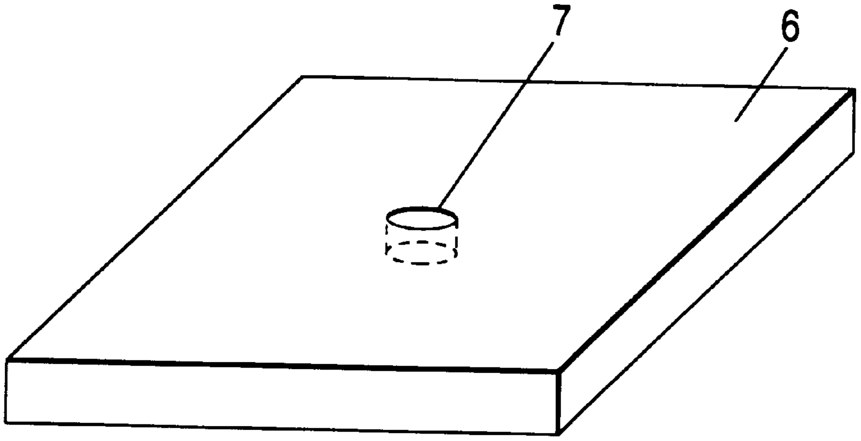
FIG. 9 is a perspective view of an embodiment according to a sixth aspect of the invention.
Figure 10:
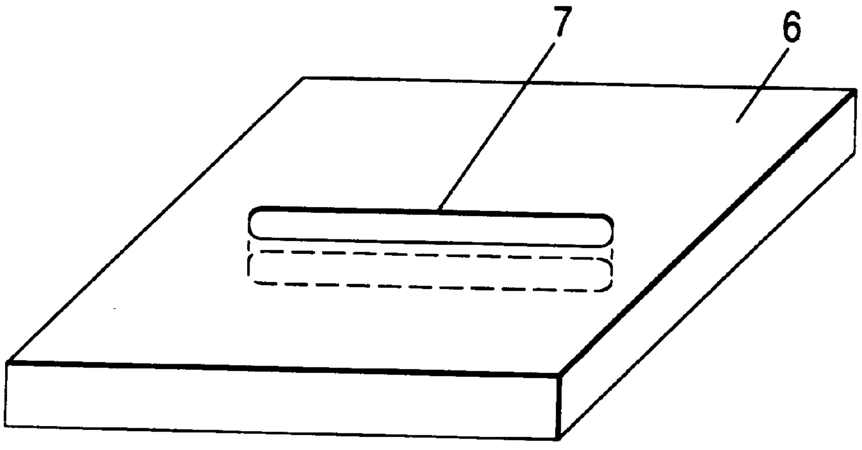
FIG. 10 is a perspective view of an embodiment according to the sixth aspect of the invention.

FIGS. 9 and 10 show embodiments according to the sixth aspect of the invention. The basic configuration of the embodiment is identical with that of Embodiment 1. The identical components are designated by the same reference numerals, and their description is omitted. Hereinafter, only the method of sealing a vent hole 7 which is a feature of the embodiments will be described. FIGS. 9 and 10 are enlarged perspective views of the vicinity of the vent hole 7 shown in FIGS. 1 to 5.

Referring to FIG. 9, a circular hole of a small diameter of, for example, about 0.2 to 0.3 $\phi$ is opened by a working method such as laser beam machining or drilling, thereby forming the vent hole 7. After the formation of the hole, the interior of the housing 1 is evacuated via the hole, and the periphery of the vent hole 7 is melted by heating. In other words, the periphery of the circular hole is melted by heating in a circular shape. In this way, the molten metal flows into the hole and completely closes the vent hole 7 so as to seal the hole in a gastight manner.

Referring to FIG. 10, a slit hole of a small width of about 0.2 mm is opened by a working method such as laser beam machining, thereby forming a vent hole 7. In this case, the portion along the slit hole is melted by heating, whereby the vent hole 7 is closed so as to be sealed in a gastight manner.

According to the methods described above, the sealing operation is conducted by melting the vent hole 7 itself, thereby producing an effect that no additional part is required.

The present embodiments may be applied to Embodiment 2 or 3. Namely, the vent hole 7 may be formed in the stationary electrode 10 or the movable shaft 13, and the hole is sealed in the same manner as the present embodiments.

Embodiment 7

Figure 11:
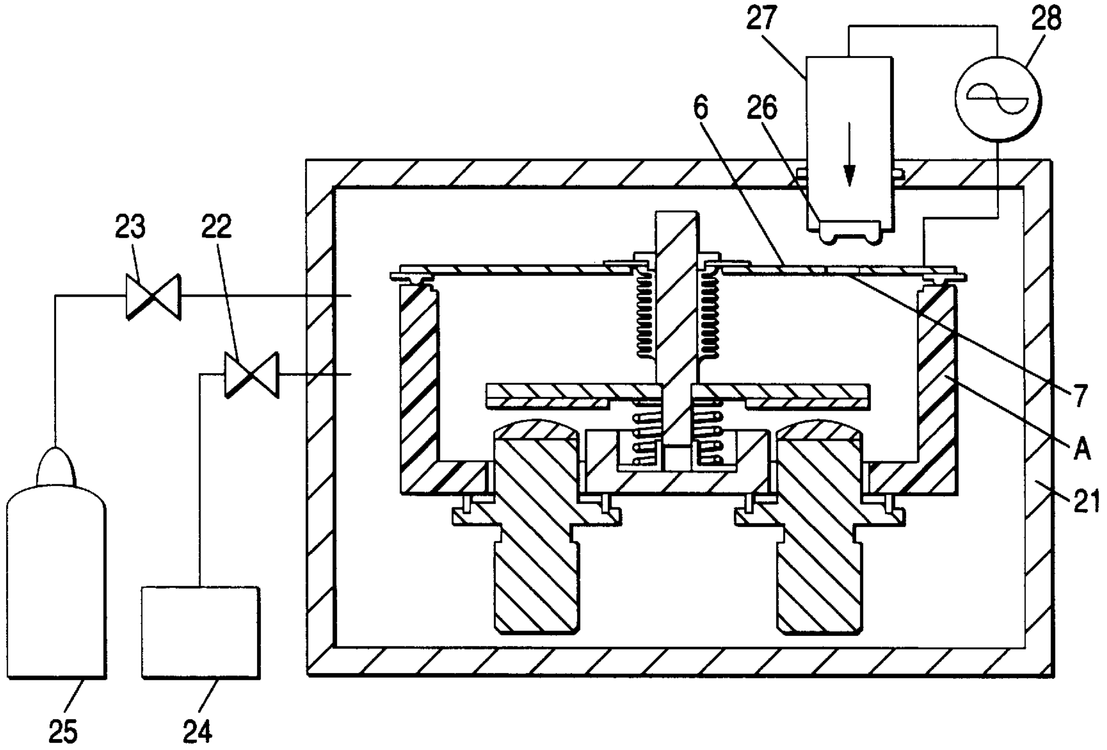
FIG. 11 is a section view of an embodiment according to a seventh aspect of the invention.

FIG. 11 shows an embodiment according to the ninth aspect of the invention. The basic configuration of the embodiment is identical with that of Embodiment 1. The identical components are designated by the same reference numerals, and their description is omitted. Hereinafter, an only device for sealing a vent hole 7 which is a feature of the embodiment will be described.

Referring to FIG. 11, a sealed contact device A is placed in a chamber 21. In the sealed contact device A, a metal lid 6 in which the vent hole 7 for supplying or exhausting a gas is formed is used as one of the components. The chamber 21 is connected to a vacuum pump 21 and a gas cylinder 25 via a vacuum valve 22 and a gas valve 23. The interior of the chamber 21 is caused to have either of a vacuum ambient or an ambient in which a gas is filled, by appropriately operating the valves 22 and 23. At this time, the configuration in which the vent hole 7 is formed in the metal lid 6 causes also the interior of the sealed contact device A to have either of a vacuum ambient or an ambient in which a gas is filled. A welding electrode 27 is disposed in the chamber 21 via a member such as an O-ring so as to be slidable while maintaining gastightness. A cap 26 is attached to the front end of the welding electrode. After the interior of the sealed contact device A is set to have a predetermined ambient state as described above, the welding electrode 27 is lowered and the cap 26 attached to the front end of the electrode is pressed against the metal lid 6 so as to cover the vent hole 7. A welding power source 28 is then operated so that a current flows between the welding electrode 27 and the metal lid 6. As a result, the cap 26 is welded to the metal lid 6, thereby completing gastight sealing of the sealed contact device A.

According to the above method, even when the vent hole 7 for supplying or exhausting a gas has a relatively large size, gastight sealing can be easily conducted. Therefore, the time required for evacuation can be shortened and the productivity of the gastight sealing step can be improved.

Embodiment 8

Figure 12:
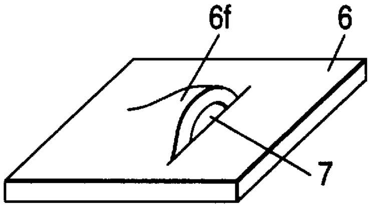
FIG. 12 is a schematic perspective view showing a vent hole in an eighth aspect of the invention.
Figure 13A:
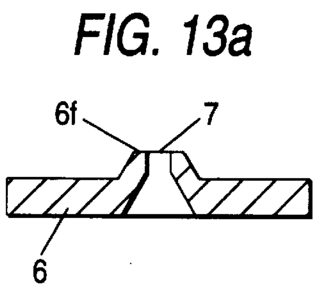
FIGS. 13*a* and 13*b* are schematic section views showing a vent hole in an embodiment of the eighth aspect of the invention.
Figure 13B:
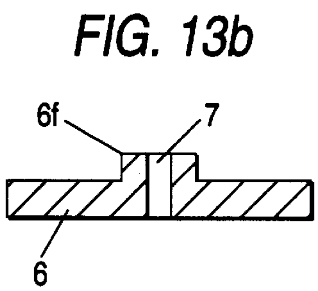
Figure 14A:
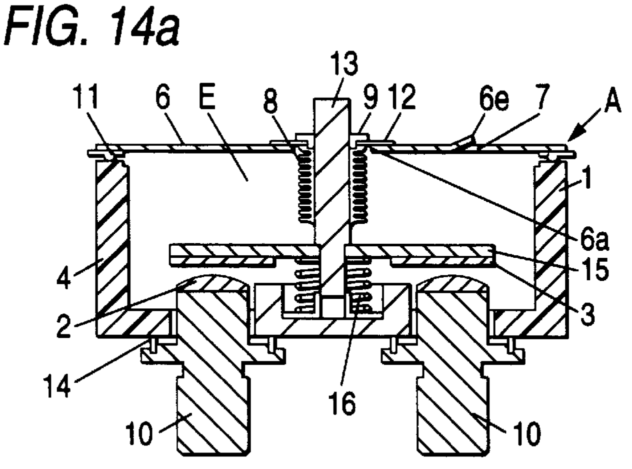
FIGS. 14*a* to 14*f* show steps of sealing a vent hole in an embodiment of a ninth aspect of the invention.
Figure 14B:
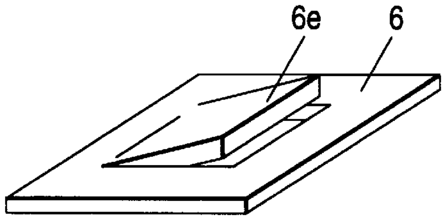
Figure 14C:
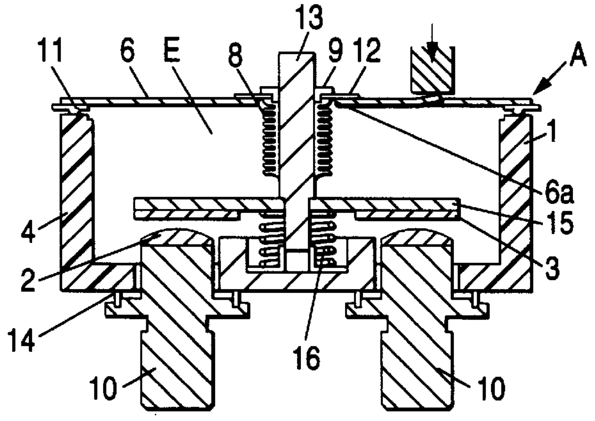
Figure 14D:
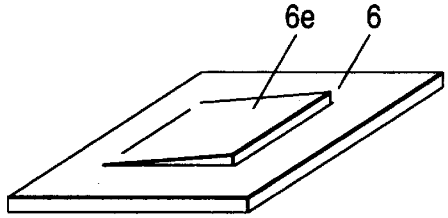
Figure 14E:
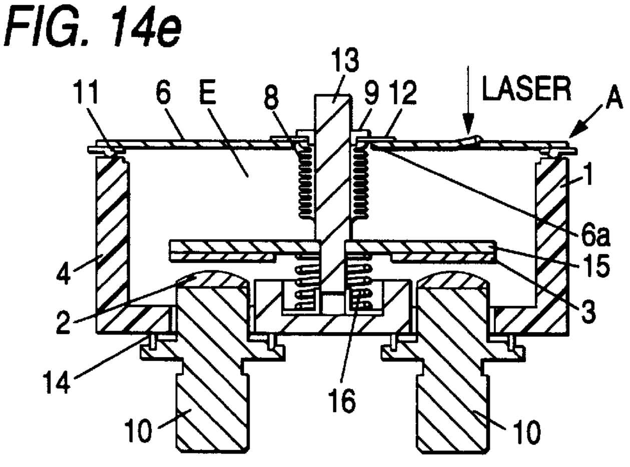
Figure 14F:
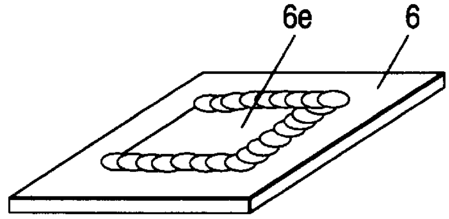
Figure 15A:
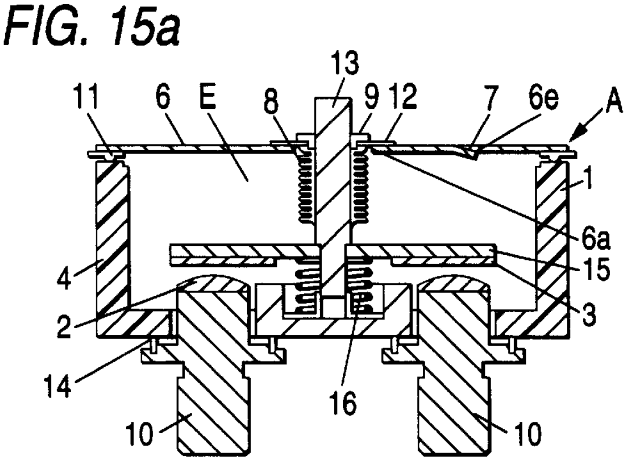
FIGS. 15*a* to 15*f* show steps of sealing a vent hole in an embodiment of a tenth aspect of the invention.
Figure 15B:
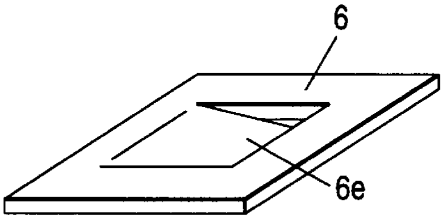
Figure 15C:
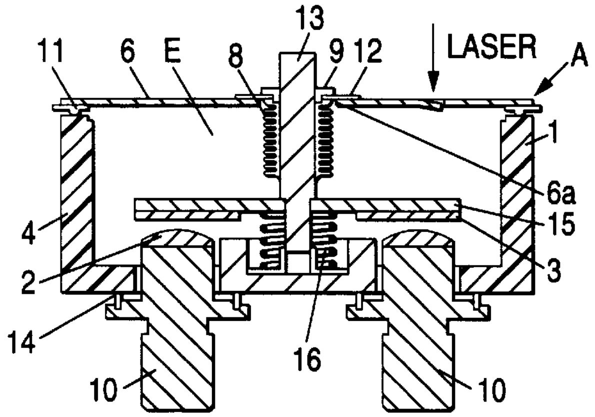
Figure 15D:
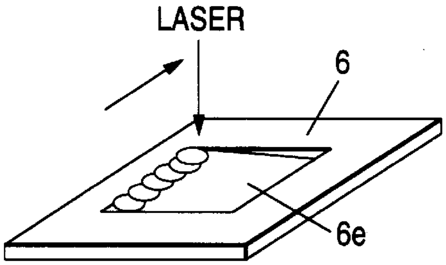
Figure 15E:
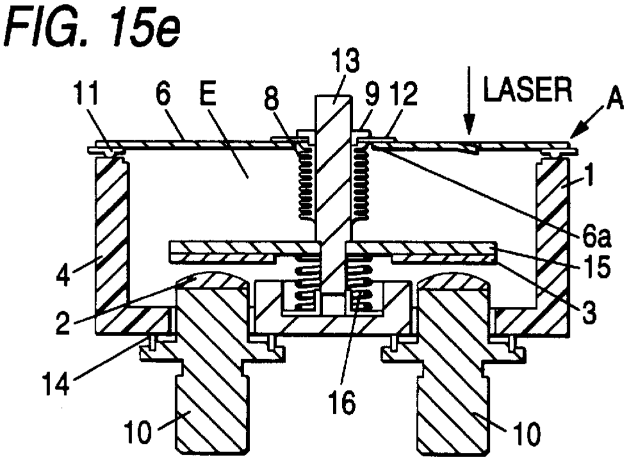
Figure 15F:
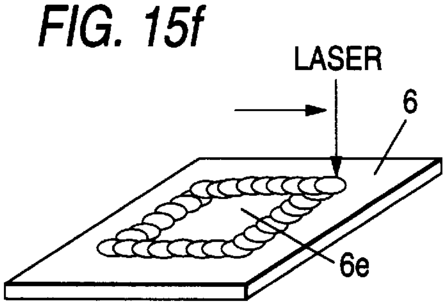

FIGS. 12 and 13 show embodiments according to the thirteenth aspect of the invention. The basic configuration of the embodiments is identical with that of Embodiment 1. The identical components are designated by the same reference numerals, and their description is omitted. Hereinafter, only the formation of a vent hole 7 and a device for sealing the hole which are features of the embodiments will be described. FIGS. 12, 13*a* and 13*b* are enlarged views of the vicinity of the vent hole 7 shown in FIGS. 1 to 5.

Referring to FIG. 12, a slit-like vent hole 7 is formed by forming a step between the metal lid 6 and its periphery by a working method such as the cut and raising method. Referring to FIG. 13*a* or 13*b*, a vent hole 7 of a small diameter is-opened by a working method such as burring, and metal padding in the form of a projection 6*f* is formed in the periphery of the hole. After the vent hole 7 is formed in this way, the interior of the housing 1 is evacuated via the vent hole 7. The periphery of the vent hole 7 is then melted by heating so as to seal the hole. In FIG. 12, the projection 6*f* in the vicinity of the slit-like vent hole 7 is melted by heating along the slit-like hole. In FIGS. 13*a* and 13*b*, the projection 6*f* in the periphery of the vent hole 7 is melted by heating. In this way, the molten metal flows into the hole and completely closes the vent hole 7 so as to seal the hole in a gastight manner.

According to the method, the projection 6*f* of the vent hole 7 is melted by heating, and hence padding can be sufficiently formed. This is advantageous for gastight sealing.

Embodiment 9

FIGS. 14*a* to 14*f* show an embodiment according to the fourteenth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

Referring to FIG. 14, a container body 4 having a box-like shape in which one face is opened is made of a heat resistant insulating material such as alumina ceramics. Two stationary electrodes 10 are joined in a gastight manner to the bottom portion of the container body 4. A gastight space E is formed by the container body 4, the stationary electrodes 10, a bellows 8, a metal lid 6 which is made of 42-alloy or the like and in which a through hole 6*a* is formed at the center and a vent hole 7 is formed at an appropriate portion, a bellows presser 12 having a bearing 9, etc. Specifically, the metal lid 6 is joined to the upper opening of the container body 4 so as to close the opening, via an upper flange 11 which is a metal portion. One end or the upper end portion of the bellows 8 is joined in a gastight manner to the metal lid 6 by clamping the end portion with the bellows presser 12, and the other end or the lower end portion of the bellows 8 is joined in a gastight manner to a movable shaft 13. The stationary electrodes 10 are made of, for example, a copper material and has a substantially multistage cylindrical shape. A stationary contact 2 is formed on the top of each of the stationary electrodes 10. The stationary electrodes 10 are joined in a gastight manner via a lower flange 14 which is made of 42-alloy or the like.

The reference numeral 15 designates a movable contacting element which is made of a copper material and which is formed into a substantially flat plate-like shape. Movable contacts 3 are Respectively fixed to the end portions of the movable contacting element 15, with being separated from each other by a distance at which the contacts can contact with and separate from the stationary contacts 2. The movable contacting element 15 is pressed against the stationary contacts 2 by a force which is exerted by an external driving unit (not shown) via the movable shaft 13. When the movable contacting element 15 is released from the driving force, the element is separated from the stationary contacts 2 by the action of a return spring 16.

Depending on the kind of the sealed contact device A, in order to improve the contact performance, hydrogen or a gas mainly containing hydrogen may be filled at, for example, about 2 atmospheres into the space via the vent hole 7 prior to the sealing operation.

In this way, the gastight space E is formed. After evacuation, the vent hole 7 is sealed.

The vent hole 7 disposed in the metal lid 6 is formed by a raised piece 6*e*. Depending on the kind of the sealed contact device A, in order to improve the contact performance, the interior of the device is evacuated via the vent hole 7, and hydrogen or a gas mainly containing hydrogen may be introduced at, for example, about 2 atmospheres into the space via the vent hole 7, in a condition shown in FIGS. 14*a* and 14*b*. Thereafter, the raised piece 6*e* is pressed from the outside so as to be mechanically plastic-deformed, thereby reducing the size of the gap, in a condition shown in FIGS. 14*c* and 14*d*. The gap portion is then irradiated with, for example, laser, and the metal in the periphery of the gap is melted so that the gap is sealed by gastight welding, in a condition shown in FIGS. 14*e* and 14*f*.

According to the method, the vent hole 7 is formed by the raised piece 6*e*. During evacuation and gas introduction, therefore, a large opening section area can be ensured, and hence the time required for evacuation and gas introduction can be shortened. Since the gap can be reduced in size by, for example, mechanically plastic-deforming the raised piece 6*e*, the metal in the periphery of the vent hole 7 can be melted by using a heat source such as a laser apparatus, with the result that the welding can be conducted so as to form a gastight configuration without additionally using a metal member.

Embodiment 10

FIGS. 15*a* to 15*f* show an embodiment according to the fifteenth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

The vent hole 7 disposed in the metal lid 6 is formed by a raised piece 6*e*. The raised piece 6*e* is formed so as to be directed to the inside of the container body 4. Depending on the kind of the sealed contact device A, in order to improve the contact performance, the interior of the device is evacuated via the vent hole 7, and hydrogen or a gas mainly containing hydrogen may be introduced at, for example, about 2 atmospheres into the space via the vent hole 7, in a condition shown in FIGS. 15*a* and 15*b*. Thereafter, the root portion of the raised piece 6*e* is locally heated by laser irradiation or the like and the portion of the raised piece 6*e* is deformed by contraction of the Locally heated portion during cooling, thereby reducing the size of the gap, in a condition shown in FIGS. 15*c* and 15*d*. The gap portion is then irradiated with, for example, laser, and the metal in the periphery of the gap is melted so that the gap is sealed by gastight welding, thereby sealing the vent hole 7, in a condition shown in FIGS. 15*e* and 15*f*.

According to the method, the vent hole 7 is formed by the raised piece 6*e*. During evacuation and gas introduction, therefore, a large opening section area can be ensured, and hence the time required for evacuation and gas introduction can be shortened. The raised piece 6*e* can be deformed in a noncontact manner by, for example, laser irradiation so as to reduce the size of the gap. The metal in the periphery of the hole can be melted by using a heat source such as a laser apparatus so as to form a gastight configuration without additionally using a metal.

The basic configuration of the embodiment of the fifteenth aspect of the invention may be modified.

Embodiment 11

FIGS. 16*a* to 16*h* show an embodiment according to the sixteenth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

The vent hole 7 disposed in a metal lid 6 is formed by a raised piece 6*e*. After raised, as shown in FIGS. 16*c* and 16*h*, the raised piece 6*e* is pressed by, for example, a pressing machine so that the thickness is reduced and the width is increased, thereby forming an overlapping portion 6*h* which is wider than the hole formed as a result of the raising operation.

Figure 16A:
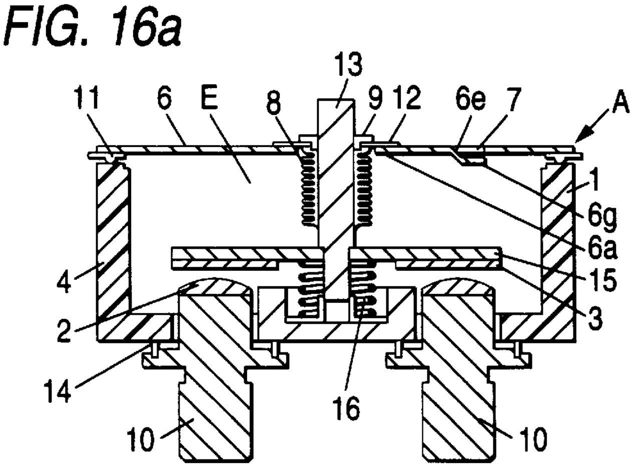
FIGS. 16*a* to 16*h* show steps of sealing a vent hole in an embodiment of an eleventh aspect of the invention.
Figure 16B:
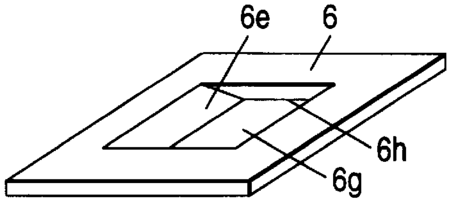
Figure 16C:
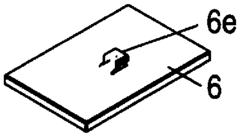
Figure 16D:
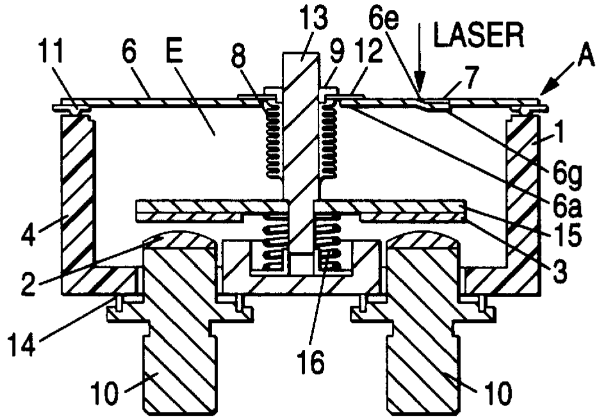
Figure 16E:
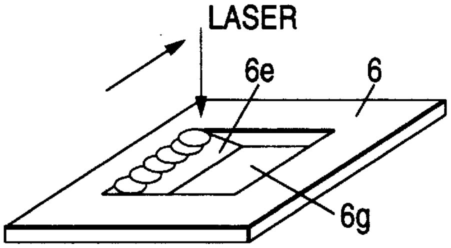
Figure 16F:
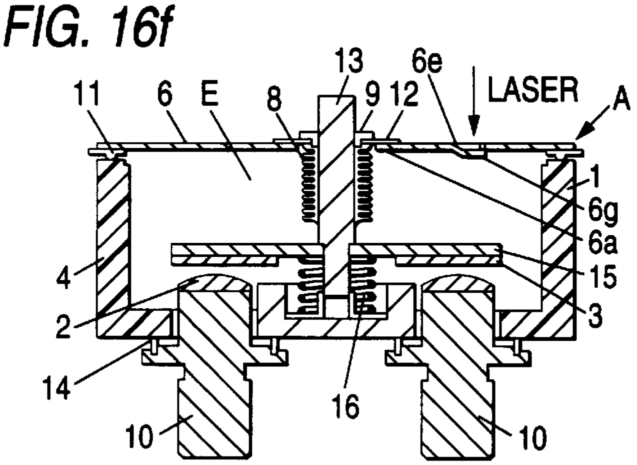
Figure 16G:
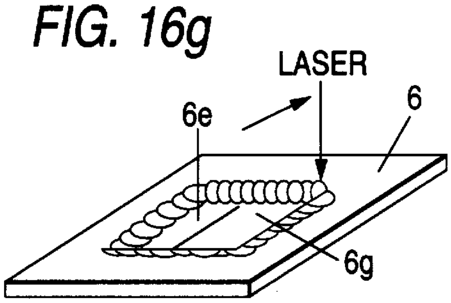
Figure 16H:
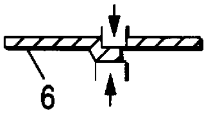

Depending on the kind of the sealed contact device A, in order to improve the contact performance, the interior of the device is evacuated via the vent hole 7, and hydrogen or a gas mainly containing hydrogen may be introduced at, for example, about 2 atmospheres into the space via the vent hole 7, in a condition shown in FIGS. 16*a* and 16*b*. Thereafter, the root portion of the raised piece 6*e* is locally heated by laser irradiation or the like and the portion of the raised piece 6*e* is deformed by contraction of the locally heated portion during cooling, thereby reducing the size of the gap, in a condition shown in FIGS. 16*d* and 16*e*. The gap portion is then irradiated with, for example, laser, and the metal in the periphery of the gap is melted so that the gap is sealed by gastight welding, in a condition shown in FIGS. 16*f* and 16*g*.

According to the method, the raised piece 6*e* is pressed by, for example, a pressing machine so that the thickness is reduced and the width is increased to form the overlapping portion 6*h*. When the root portion of the raised piece 6*e* is locally heated by, for example, laser irradiation and contraction of the locally heated portion during cooling causes the raised piece 6*e* to be deformed so as to reduce the size of a gap, the overlapping portion 6*h* overlaps with the edge of the hole formed as a result of the raising operation. Consequently, the welding for forming a gastight configuration can be easily conducted and the reliability of the welding is enhanced.

Embodiment 12

FIGS. 17*a* to 17*e* show an embodiment according to the seventeenth aspect of the invention. The basic configuration of the embodiment is identical with that of Embodiments 1 and 10. The identical components are designated by the same reference numerals, and their description is omitted. Hereinafter, only the method of sealing a vent hole 7 which is a feature of the embodiment will be described.

Figure 17A:
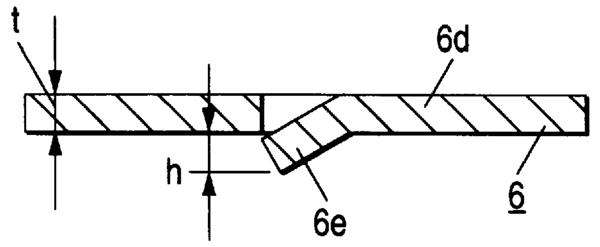
FIGS. 17*a* to 17*e* illustrate formation and sealing of a vent hole in an embodiment of a twelfth aspect of the invention.
Figure 17B:
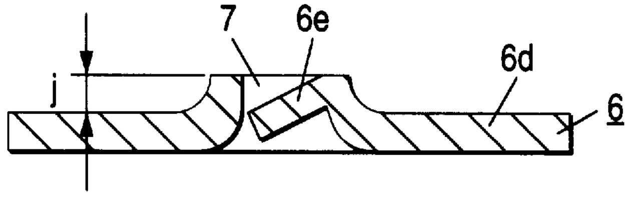
Figure 17C:
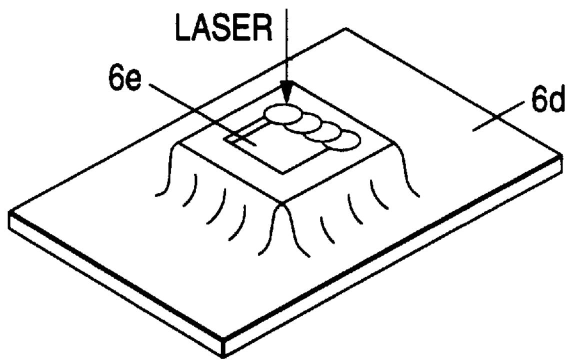
Figure 17D:
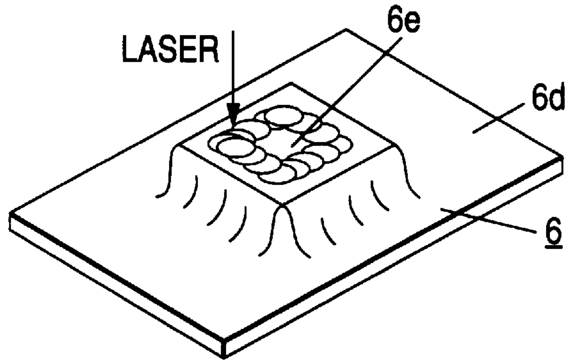
Figure 17E:
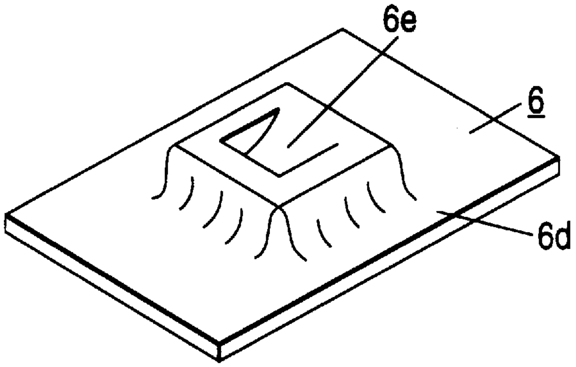

First, as shown in FIG. 17*a*, a raised piece 6*e* is formed in a metal plate 6*d* of a thickness t of, for example, 0.5 mm, so that an inward raised height h in the direction of the thickness is 0.7 mm. As shown in FIG. 17*b*, the metal portion in the periphery of the raised piece 6*e* is previously projected toward the outside by plastic-deformation so as to have a raised height j of 0.7 mm or more. Depending on the kind of the sealed contact device A, in order to improve the contact performance, the interior of the device is evacuated via the vent hole 7, and hydrogen or a gas mainly containing hydrogen may be introduced at, for example, about 2 atmospheres into the space via the vent hole 7. Thereafter, the root portion of the raised piece 6*e* is locally heated by laser irradiation or the like and the portion of the raised piece 6*e* is deformed by contraction of the locally heated portion during cooling, thereby reducing the size of the gap, as shown in FIG. 17*c*. The gap portion is then irradiated with, for example, laser, and the metal in the periphery of the gap is melted so that the gap is sealed by gastight welding, as shown in FIGS. 17*d* and 17*e*.

According to the embodiment, the raised piece 6*e* is not projected from the lower face of the metal plate 6*d*. When another part exists below the metal plate 6*d*, for example, the raised piece is prevented from interfering with the part. The deformed portion which is projected functions as a rib so as to prevent the periphery from being deformed by welding distortion.

The basic configuration of the embodiment of the seventeenth aspect of the invention may be modified.

Embodiment 13

Figure 18A:
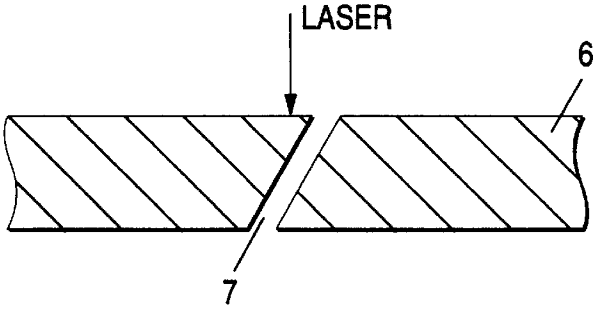
FIGS. 18*a* and 18*b* are views illustrating formation and sealing of a vent hole in an embodiment of a thirteenth aspect of the invention.
Figure 18B:
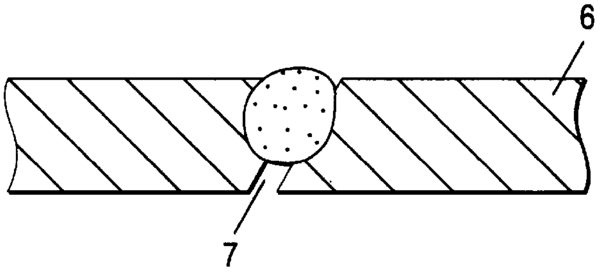

FIGS. 18*a* and 18*b* show an embodiment according to the eighteenth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

A circular hole of a small diameter of, for example, about 0.2 to 0.3 ϕ is opened in a slanting direction, thereby forming the vent hole 7. After the formation of the hole, the interior of the container body 4 is evacuated via the vent hole 7, and the vicinity (the side where the hole is formed) of the vent hole 7 of the metal lid 6 is melted by heating by using a heat source such as a laser apparatus so as to conduct welding, as shown in FIG. 18*a*. In this way, the molten metal flows into the portion of the vent hole 7 and completely closes the vent hole 7 so as to seal the hole in a gastight manner, as shown in FIG. 18*b*.

According to the embodiment, the vent hole 7 is slantingly opened. Even when irradiation from a heat source such as a laser apparatus is perpendicularly applied to the metal lid 6, therefore, gastight sealing can be easily realized.

Embodiment 14

Figure 19A:
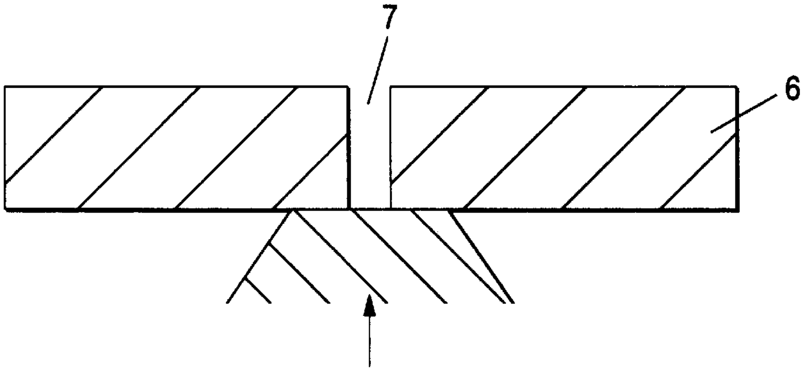
FIGS. 19*a* and 19*b* are views illustrating thinning of a portion where a vent hole is formed in an embodiment of a fourteenth aspect of the invention.
Figure 19B:
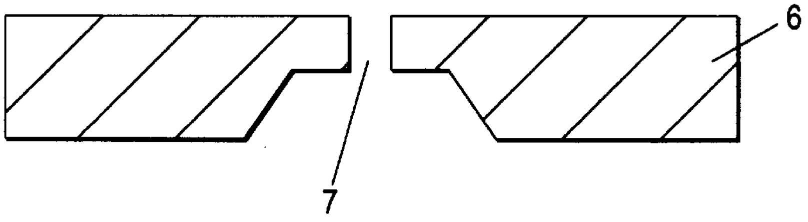

FIGS. 19*a* and 19*b* show an embodiment according to the nineteenth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described. FIG. 19 shows a section of the through hole shown in FIG. 9.

First, as shown in FIG. 19*a*, the periphery of the vent hole 7 is subjected to a pressing process, and the periphery of the hole is then pressed so as to have a reduced thickness, as shown in FIG. 19*b*. After the vent hole 7 is formed in this way, the interior of the container body 4 is evacuated via the vent hole 7. The periphery of the vent hole 7 is then melted by heating and the vent hole 7 is completely closed so as to be sealed in a gastight manner.

Figure 20:
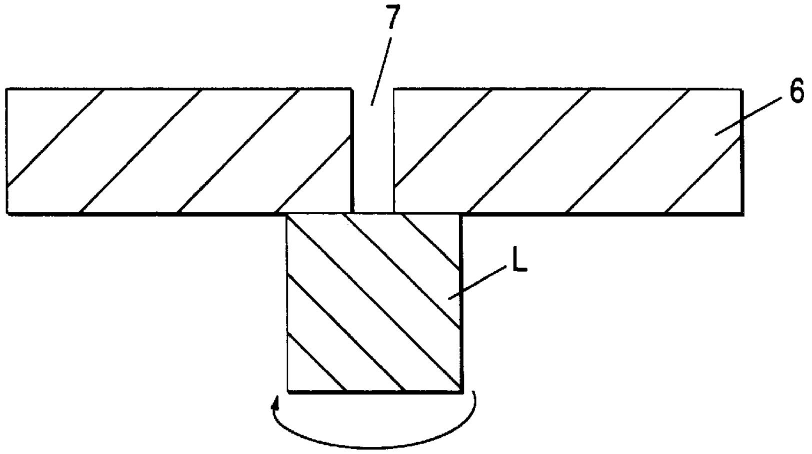
FIG. 20 is a view illustrating thinning of a portion where a vent hole is formed in an embodiment of the fourteenth aspect of the invention.

FIG. 20 shows an example in which a cutting process using an end mill L or the like is employed as the method of thinning the metal lid 6.

According to the embodiment, the reduced thickness of the peripheral portion of the vent hole 7 lowers the resistance exerted on air passing through the vent hole 7. Therefore, the interior of the container body 4 can be easily evacuated and the time required for evacuation can be shortened.

The basic configuration of the embodiment of the nineteenth aspect of the invention may be modified.

Embodiment 15

Figure 21A:
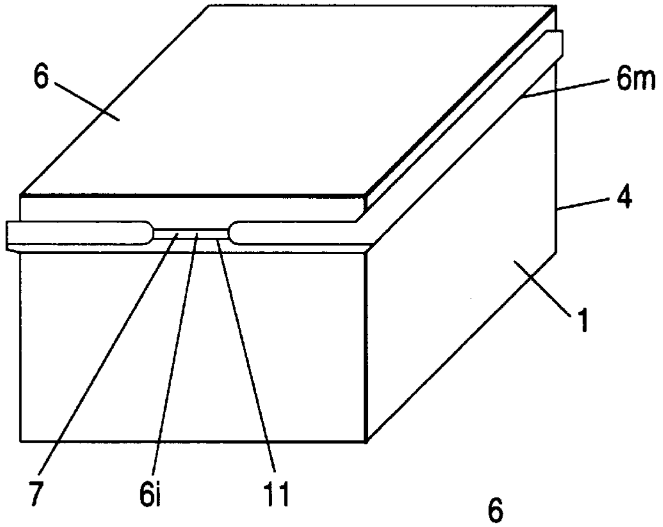
FIGS. 21*a* and 21*b* are schematic perspective views illustrating formation and sealing of a vent hole in an embodiment of a fifteenth aspect of the invention.
Figure 21B:
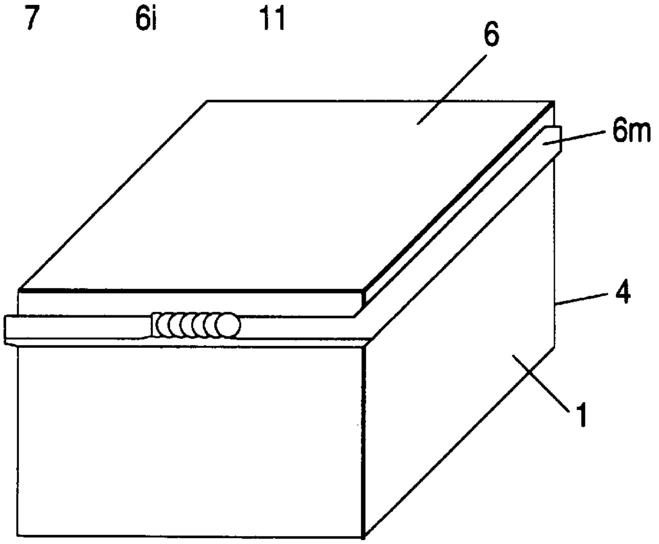

FIGS. 21*a* and 21*b* show an embodiment according to the twentieth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

An upper flange 11 which is a metal portion is formed in the opening of a container body 4 which is made of ceramics and which has been described in the embodiments of the first to third aspects of the invention. The upper flange 11 is joined to the whole periphery of the metal lid 6, thereby forming a gastight space E. In the embodiment, no hole is previously formed in the metal lid 6, and, in the step of joining the upper flange 11 to the whole periphery of the metal lid 6, a part of the periphery is unjoined so that a slit-like vent hole 7 is formed, as shown in FIG. 21*a*. The interior of the housing 1 is evacuated via the slit-like vent hole 7 formed in the unjoined portion. Thereafter, the portion along the slit-like vent hole 7 is melted by heating, whereby the vent hole 7 is completely closed so as to be sealed in a gastight manner, as shown in FIG. 21*b*. In the figures, 6 m designates a joined portion, and 6*i* designates an unjoined portion.

According to the embodiment, a part of the joined portion between the upper flange 11 and the metal lid 6 is unjoined so as to be formed as the slit-like vent hole 7. Therefore, it is not necessary to form a hole in the metal lid 6 and hence the step of forming a hole can be reduced. In the sealing step, it is possible to employ a process similar to that which is conducted in the previous step of joining the upper flange 11 to the whole periphery of the metal lid 6.

Embodiment 16

FIGS. 22*a* to 22*f* show embodiments according to the twenty-first aspect of the invention. The basic configuration of the embodiments are identical with that of Embodiment 1. The identical components are designated by the same reference numerals, and their description is omitted. Hereinafter, only the formation of a vent hole 7 and a device for sealing the hole which are features of the embodiment will be described.

Figure 22A:
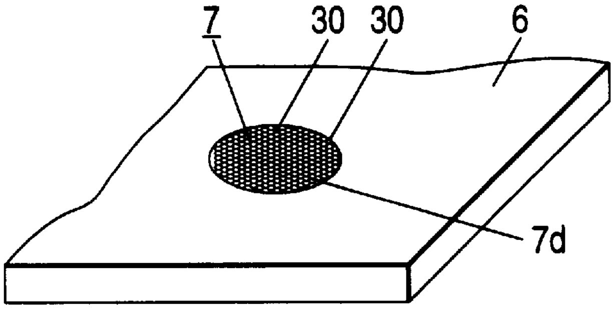
FIGS. 22*a* to 22*f* show formation of a vent hole in an embodiment of a sixteenth aspect of the invention.
Figure 22B:
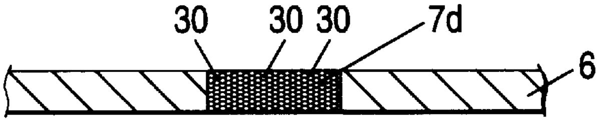

FIG. 22*a* shows a configuration in which metal powder 30 is packed into an opening of a metal lid 6 and a porous structure is formed by pressing or the like, so that the vent hole 7 is configured by a number of pores 7*d*. FIG. 22*b* is a section view of the configuration. In this case, when the temperature and the pressure are set to be lower than those in the formation of a conventional sintered metal, metal particles are prevented from completely bonding together, and a provisional sintered state having a substantial air permeability can be obtained.

Figure 22C:
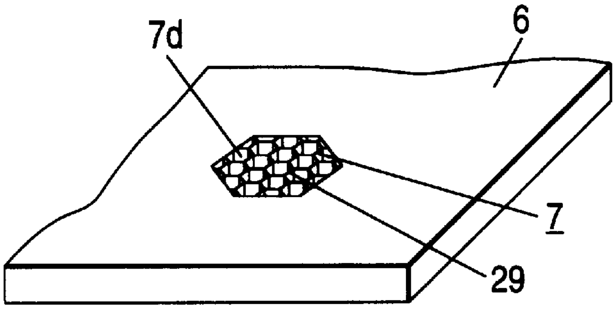
Figure 22D:
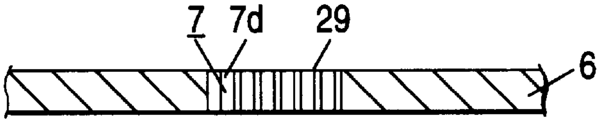

FIG. 22*c* shows a configuration in which a vent hole 7 is formed by packing a porous extruded material 29 of a structure such as a so-called honeycomb structure having a number of holes of a hexagonal section shape, into an opening of a metal lid 6. FIG. 22*d* is a section view of the configuration.

Figure 22E:
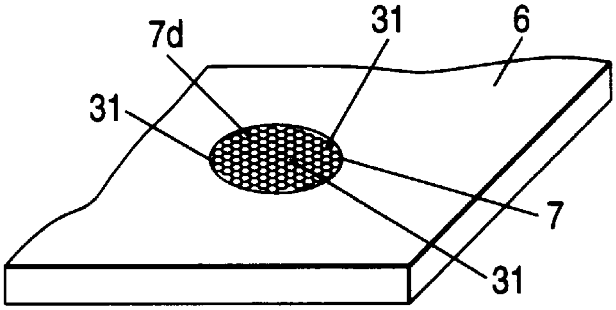
Figure 22F:
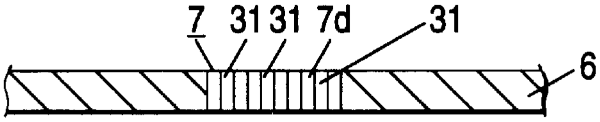
Figure 23A:
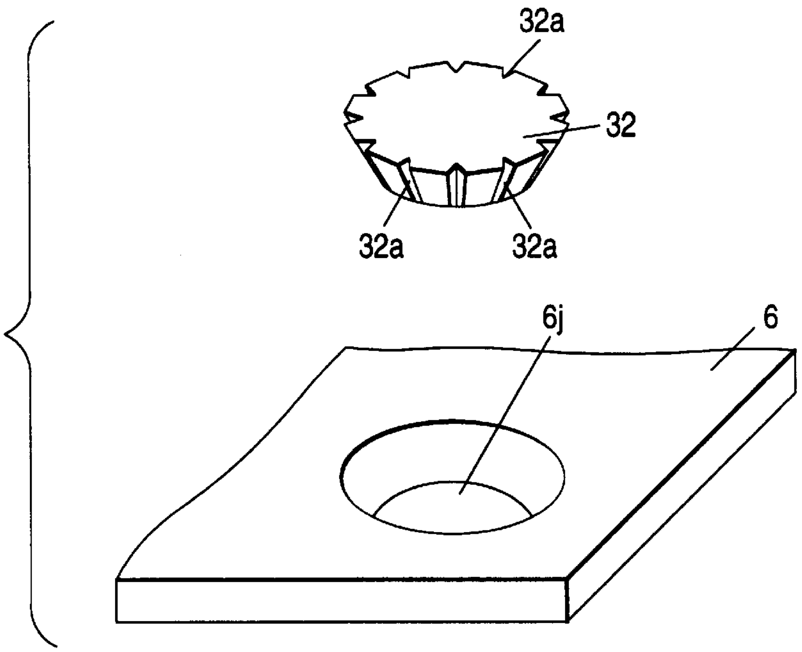
FIGS. 23*a* to 23*d* show an embodiment according to a seventeenth aspect of the invention.
Figure 23B:
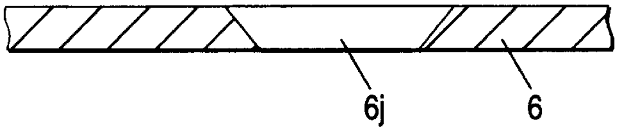
Figure 23C:
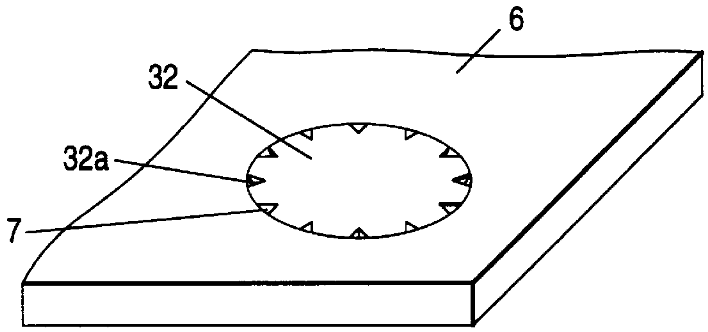
Figure 23D:
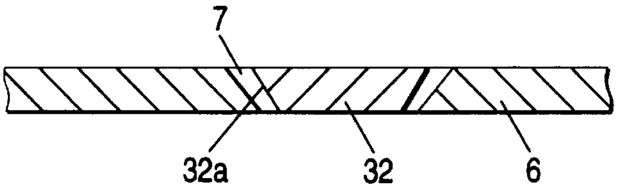

FIG. 22*e* shows a configuration in which a vent hole 7 is formed by packing a bundle of wire members 31 of, for example, a circular section shape, into an opening of a metal lid 6. The vent hole 7 can be ensured by a number of pores 7*d* formed among the wire members 31. FIG. 22*f* is a section view of the configuration.

According to the embodiment, since the many pores 7*d* are used, the vent hole 7 can be easily sealed in a gastight manner after the operation of supplying and exhausting a gas and the reliability of the sealing is enhanced.

Embodiment 17

FIGS. 23*a* to 23*d* show an embodiment according to the twenty-second aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described. FIG. 23*a* to 23*d* show an enlarged view of the opening 6*j* for the vent hole 7 shown in FIGS. 1 to 5.

A plug member 32 which is to be fitted into the opening 6*j* formed in a metal lid 6 has an external shape substantially corresponding to the opening 6*j*. A number of grooves 32*a* are formed in the outer circumference of the plug member 32. When the plug member is fitted into the opening 6*j*, therefore, a fine vent hole 7 is formed by the grooves 32*a*. After, the interior of the container body 4 is evacuated via the vent hole 7, the portion along the vent hole 7 is melted by heating, thereby sealing the hole in a gastight manner.

According to the embodiment, the minute vent hole 7 is formed by the separate plug member 32. As compared with the process of forming pores in the metal lid 6, therefore, the embodiment can obtain the minute vent hole 7 more easily and economically. When the grooves 32*a* are arranged along the outer circumference of the plug member 32 which is substantially conical, the plug member can be melted by heating with moving a heat source in a circle. Consequently, gastight sealing can be easily conducted.

Embodiment 18

Figure 24:
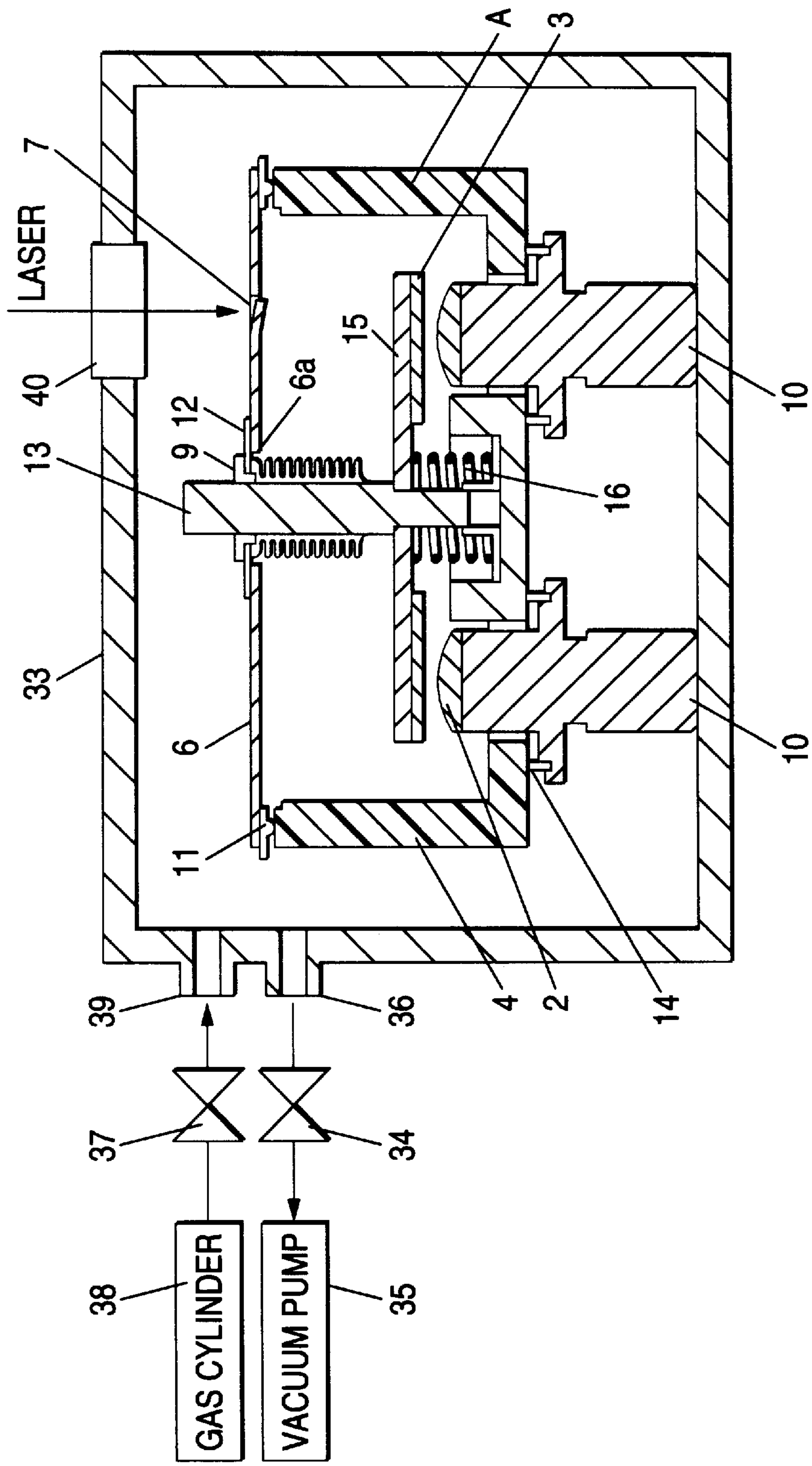
FIG. 24 is a view illustrating sealing of a vent hole in an embodiment of an eighteenth aspect of the invention.

FIG. 24 shows an embodiment according to the twenty-third aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

A sealed contact device A is placed at a predetermined position in a closed chamber 33. The chamber 33 has an outlet hole 36 which is connected to a vacuum pump 35 via an evacuation valve 34, and an inlet hole 39 which is connected to a gas cylinder 38 via a gas supply valve 37. A glass window 40 through which laser can be irradiated from the outside is formed above the vent hole 7 of the sealed contact device A.

When the evacuation valve 34 is opened, the interior of the chamber 21 is caused to have a substantial vacuum state by the operation of the vacuum pump 35. At this time, the configuration in which the vent hole 7 is provided causes also the interior of the sealed contact device A to have a substantial vacuum state. When the evacuation valve 34 is closed and the gas supply valve 37 is opened, the interiors of the closed chamber 33 and the sealed contact device A are caused to have a gas-filled state by the gas cylinder 38. After the internal ambient of the sealed contact device A is set to have a predetermined state as described above, laser is irradiated to the vent hole 7 from the outside via the glass window 40, thereby welding the vent hole 7. As a result, the sealed contact device A is completely sealed. Even after the device is taken out from the closed chamber 33, the internal ambient of the device is maintained at that state.

According to the embodiment, since the whole of the sealed contact device A is placed in the closed chamber 33, the possibility that an explosion due to mixture of the gas and air may occur during laser irradiation can be eliminated and hence the method is safer.

Embodiment 19

Figure 25:
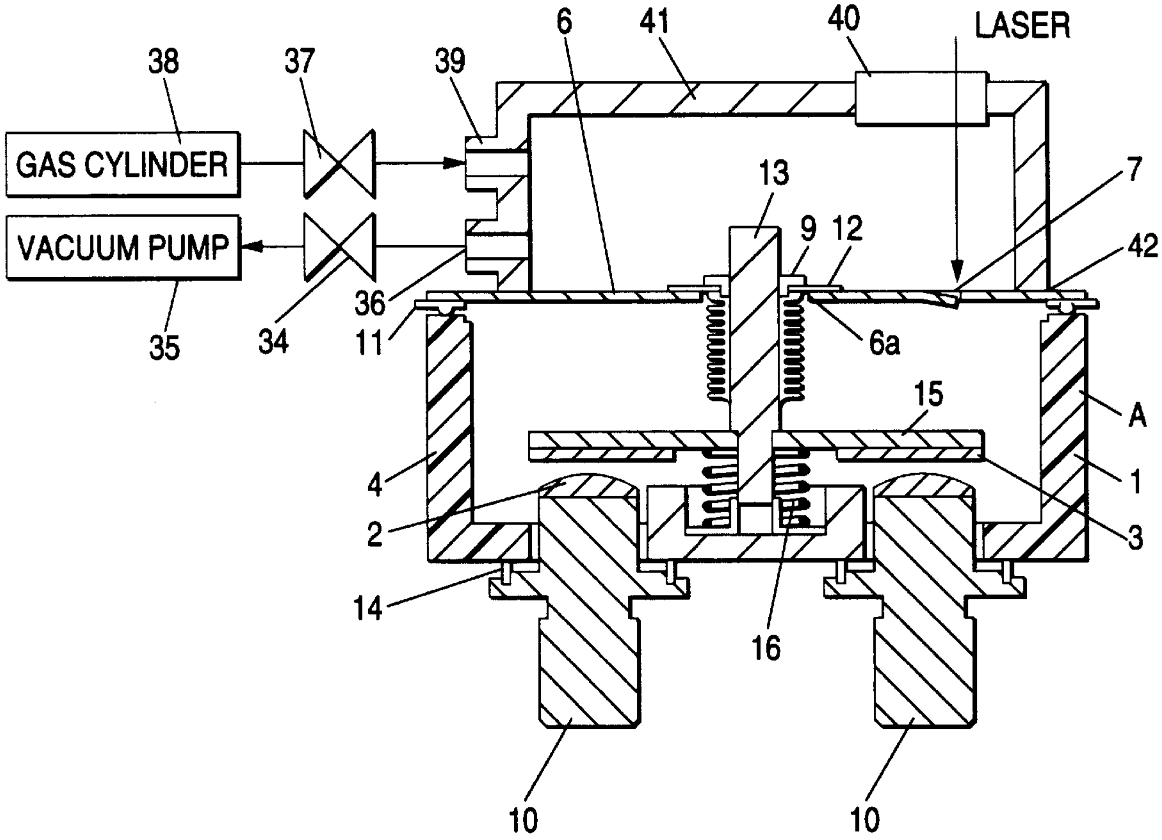
FIG. 25 is a view illustrating sealing of a vent hole in an embodiment of a nineteenth aspect of the invention.

FIG. 25 shows an embodiment according to the twenty-fourth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

A port member 41 is attached to a metal lid 6 of a sealed contact device A in which the vent hole 7 is formed, by using a seal material 42 while maintaining the gastightness. The port member 41 has an outlet hole 36 which is connected to a vacuum pump 35 via an evacuation valve 34, and an inlet hole 39 which is connected to a gas cylinder via a gas supply valve 37. A glass window 40 through which laser can be irradiated from the outside is formed above the vent hole 7 of the sealed contact device A.

When the evacuation valve 34 is opened, the interior of the port member 41 is caused to have a substantial vacuum state by the operation of the vacuum pump 35. At this time, the configuration in which the vent hole 7 is provided causes also the interior of the sealed contact device A to have a substantial vacuum state. When the evacuation valve 34 is closed and the gas supply valve 37 is opened, the interiors of the port member 41 and the sealed contact device A are caused to have a gas-filled state by the gas cylinder 38. After the internal ambient of the sealed contact device A is set to have a predetermined state as described above, laser is irradiated to the vent hole 7 from the outside via the glass window 40, thereby welding the vent hole 7. As a result, the sealed contact device A is completely sealed. Even after the part member 41 is detached from the device, the internal ambient of the device is maintained at that state.

According to the embodiment, since gas supply and exhaust are conducted via the port member 41, the evacuation region can be made smaller. Therefore, the time required for evacuation can be shortened and the productivity of the gastight sealing step can be improved.

Embodiment 20

FIGS. 26*a* to 26*f* show embodiments according to the twenty-fifth aspect of the invention. The basic configuration of the embodiments are identical with that of Embodiment 1. The identical components are designated by the same reference numerals, and their description is omitted. Hereinafter, only the formation of a vent hole 7 and a device for sealing the hole which are features of the embodiment will be described.

Figure 26A:
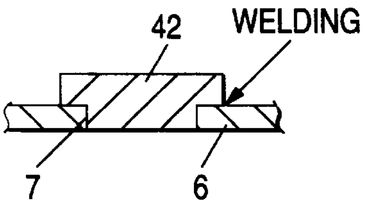
FIGS. 26*a* to 26*f* show sealing of a vent hole in an embodiment of a twentieth aspect of the invention.
Figure 26C:
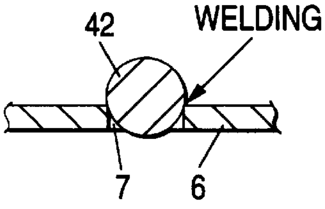
Figure 26E:
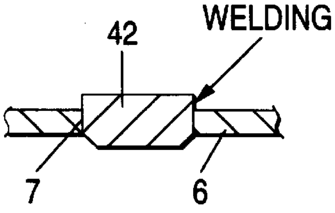
Figure 26B:
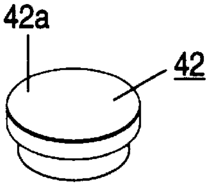
Figure 26D:
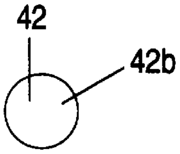
Figure 26F:
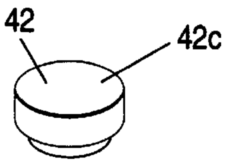

FIGS. 26*a* and 26*b* show a manner of attaching stepped pin 42*a* which serves as a metal member 42, FIGS. 26*c* and 26*d* show a manner of attaching a ball 42*b* which serves as the metal member 42, and FIGS. 26*e* and 26*f* show a manner of attaching a chamfered pin 42*c* which serves as the metal member 42. The stepped pin 42*a,* the ball 42*b,* and the chamfered pin 42*c* which serve as the metal member 42 are used as a cap. After such a cap is fitted into the vent hole 7 of a metal lid 6, gastight sealing is realized by welding or brazing.

In the case of the stepped pin 42*a,* when the pin is fitted into the metal lid 6, the head functions as an overlapping portion with respect to the metal lid 6. Therefore, the limitation of the insertion of the pin can be easily managed and the welding operation can be easily conducted.

The ball 42*b* has a feature that it can be easily positioned with respect to the vent hole 7 of the metal lid 6. Preferably, the operation of positioning the metal member 42 functioning as a cap with respect to the vent hole 7 is conducted in the same step as that of evacuation or gas filling. To comply with this, the fitting operation must be conducted in, for example, the sealed chamber 33. Therefore, it is difficult to conduct such an operation in a complicated and accurate manner. When the ball 42*b* is used as a cap, however, the positioning can be conducted only by, for example, dropping the ball 42*b* held above the vent hole 7. The chamfered pin 42*c* has an advantage that the shape is simple and hence the pin can be easily produced.

In all the cases, the metal member 42 serving as a cap is supplied, and thereafter the metal member 42 is welded to the metal lid 6, thereby ensuring gastightness. The welding method is not restricted to the electric resistance welding described in the embodiment of the ninth aspect of the invention, and includes various welding methods such as laser, optical beam, and arc welding, and also brazing.

Embodiment 21

Figure 27A:
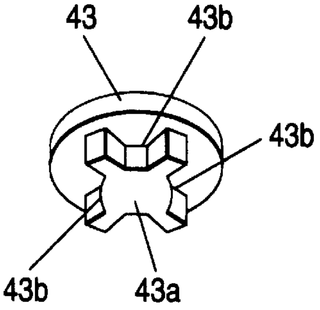
FIGS. 27*a* to 27*c* show formation and sealing of vent hole in an embodiment of a twenty-first aspect of the invention.
Figure 27B:
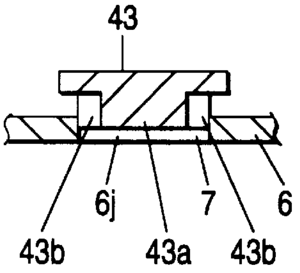
Figure 27C:
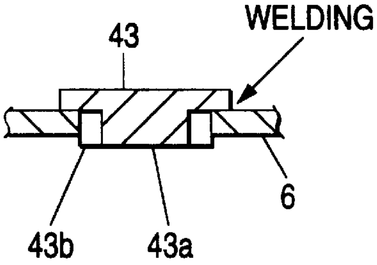

FIGS. 27*a* to 27*c* show an embodiment according to the twenty-sixth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

FIG. 27*a* is a perspective view of a plug 43, FIG. 27*b* shows a state in which the plug 43 is provisionally fixed to an opening 6*j* of a metal lid 6, and FIG. 27*c* shows a state in which the plug 43 is pressingly inserted into the innermost portion of the opening 6*j* of the metal lid 6 and the opening 6*j* is disposed to be sealed by welding the flange of the plug 43.

Gaps or grooves 43*b* are formed on a projection 43*a* of the plug 43 shown in FIGS. 27*a* to 27*c* so as to be arranged in a circumferential direction and at regular intervals. As shown in FIG. 27*b,* therefore, the vent hole 7 remains to exist in the periphery of the projection 43*a* of the plug 43 which is partly fitted into the opening 6*j* of the metal lid 6 and provisionally fixed in advance. Evacuation or gas introduction can be freely conducted via the vent hole 7. Under the state where evacuation or gas introduction is completed, the plug 43 is further pressingly inserted as shown in FIG. 27*c,* and the flange of the plug 43 is welded, thereby sealing the vent hole 7.

When the plug 43 having a shape such as shown in FIGS. 27*a* to 27*c* is used, the plug 43 can be provisionally fixed to the metal lid 6 in advance. The subsequent steps do not require works of supplying, chucking, and positioning of the plug 43, and the like, and require only relatively simple works of pressingly inserting the plug 43 and then welding it. Therefore, it is possible to provide a method which can be easily performed even in, for example, the chamber 21 or 33 for gas introduction, and in which the productivity can be enhanced.

The basic configuration of the embodiment of the twenty-sixth aspect of the invention may be modified.

Embodiment 22

Figure 28A:
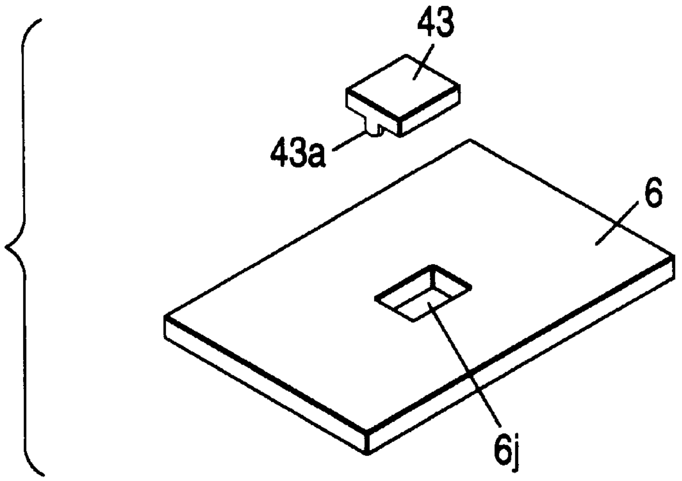
FIGS. 28*a* to 28*c* show formation and sealing of vent hole in an embodiment of a twenty-second aspect of the invention.
Figure 28B:
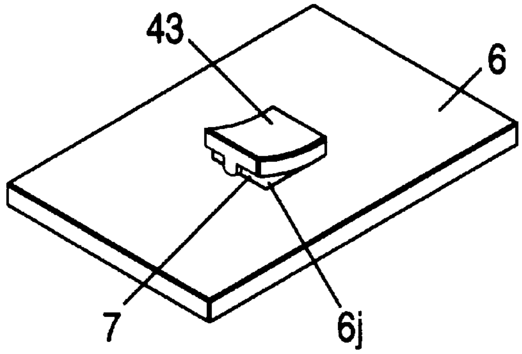
Figure 28C:
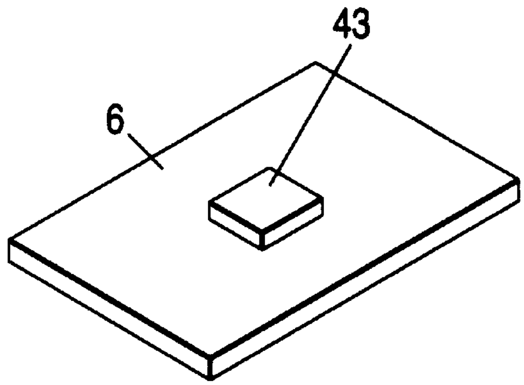

FIGS. 28*a* to 28*c* show an embodiment according to the twenty-seventh aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

FIG. 28*a* is an exploded perspective view of a metal lid 6 in which an opening 6*j* is formed, and plug 43 having a projection 43*a* on the rear face. FIG. 28*b* shows a state in which one end of the plug 43 which is opposite to the side where the projection 43*a* is formed is welded to the vicinity of the opening 6*j* of the metal lid 6. At this time, the projection 43*a* of the plug 43 is pressed against the metal lid 6, and the plate-like plug 43 is elastically deformed and welded so as to be urged toward the opening 6*j*. Therefore, a gap is ensured between the metal lid 6 and the plug 43 so that the vent hole 7 is formed. Evacuation or gas introduction can be conducted via the vent hole 7. FIG. 28*c* shows a state in which, after evacuation or gas introduction is ended in this way, the projection 43*a* of the plug 43 is irradiated with laser. At this time, the plug 43 which is elastically deformed is pushed by the spring force of the plug against the metal lid 6, and the gap between the metal lid 6 and the plug is substantially closed. Thereafter, the outer peripheral portion of the plug 43 is further welded by using laser or the like, thereby completing gastight sealing.

According to the embodiment, the metal lid 6 and the plug 43 can be provisionally fixed to each other in advance with ensuring a gap therebetween. The subsequent steps do not require works such as those of supplying, chucking, and positioning of the plug 43 and require only noncontact works for conducting laser welding. Therefore, it is possible to provide a method which can be easily performed even in, for example, the chamber 21 or 33 for gas introduction, and in which the productivity can be enhanced.

The basic configuration of the embodiment of the twenty-seventh aspect of the invention may be modified.

Embodiment 23

Figure 29A:
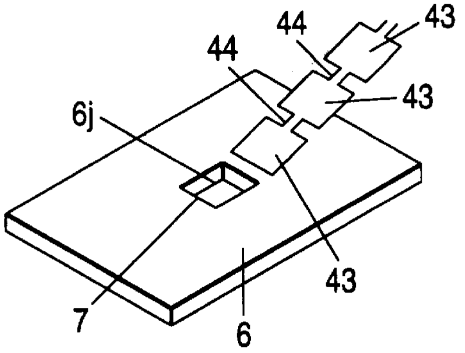
FIGS. 29*a*, 29*b*, and 29*c* are perspective views showing sealing of a vent hole in an embodiment of a twenty-eighth aspect of the invention.
Figure 29B:
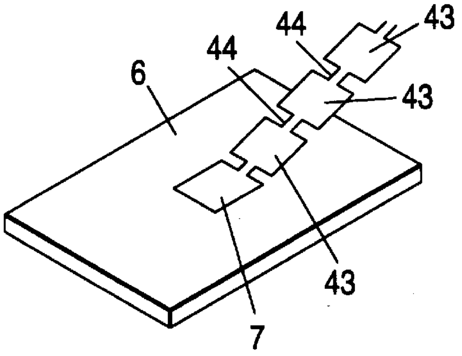
Figure 29C:
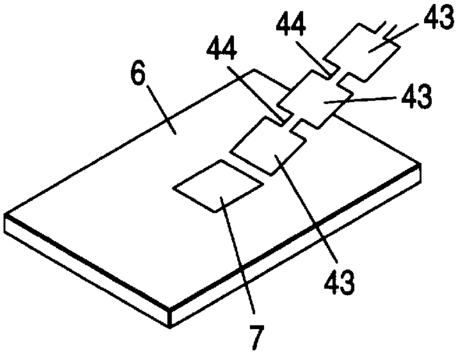

FIGS. 29*a* to 29*c* shows an embodiment according to the twenty-eighth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

FIG. 29*a* is a perspective view showing a metal lid 6 having the vent hole 7 formed by an opening 6*j*, and a hoop-like member in which plural plugs 43 are separably connected via separation pieces 44. After evacuation or gas introduction is conducted via the vent hole 7, the top plug 43 is sent to a position above the vent hole 7 as shown in FIG. 29*b*. Thereafter, the periphery of the plug 43 is welded by, for example, laser, as shown in FIG. 29*c*. At the same time with or immediately after the welding operation, the corresponding separation piece 44 is cut off by laser or the like, thereby completing gastight sealing.

According to the embodiment, the plugs 43 are continuously supplied and the productivity of the gastight sealing step can be enhanced.

The basic configuration of the embodiment of the twenty-eighth aspect of the invention may be modified.

Embodiment 24

Figure 30A:
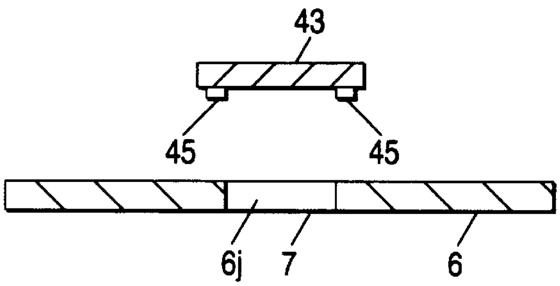
FIGS. 30*a* and 30*b* are section views showing sealing of a vent hole in an embodiment of a twenty-ninth aspect of the invention.
Figure 30B:
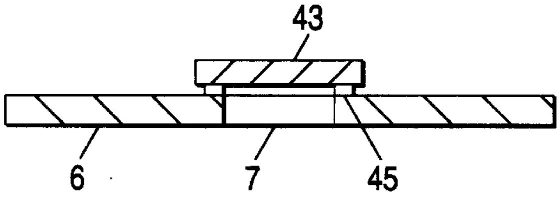

FIGS. 30*a* and 30*b* show an embodiment according to the twenty-ninth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

FIG. 30*a* shows a metal lid 6 having the vent hole 7 formed by an opening 6*j*, and a plug 43 on the periphery of which a brazing material 45 is previously deposited. When the brazing material 45 in the form of paste is applied to the plug 43 or the material in the form of a sheet is provisionally welded to the plug 43, the brazing material and the plug can be integrally supplied. After evacuation or gas introduction is conducted via the vent hole 7, the plug 43 is attached onto the vent hole 7 of the metal lid 6 as shown in FIG. 30*b*. Under this state, the whole of the metal lid 6 and the plug 43, or the portion where the two members are joined to each other is locally heated, thereby conducting brazing. As a result, gastight sealing is completed.

According to the embodiment, it is not required to conduct works such as those of supplying and applying a brazing material in the chamber 21 or 33 for evacuation and gas introduction. Unlike the case where welding is conducted, the operation of positioning the plug 43 and the heating portion does not require high accuracy, and hence the productivity of the gastight sealing step can be enhanced.

The basic configuration of the embodiment of the twenty-ninth aspect of the invention may be modified.

Embodiment 25

Figure 31A:
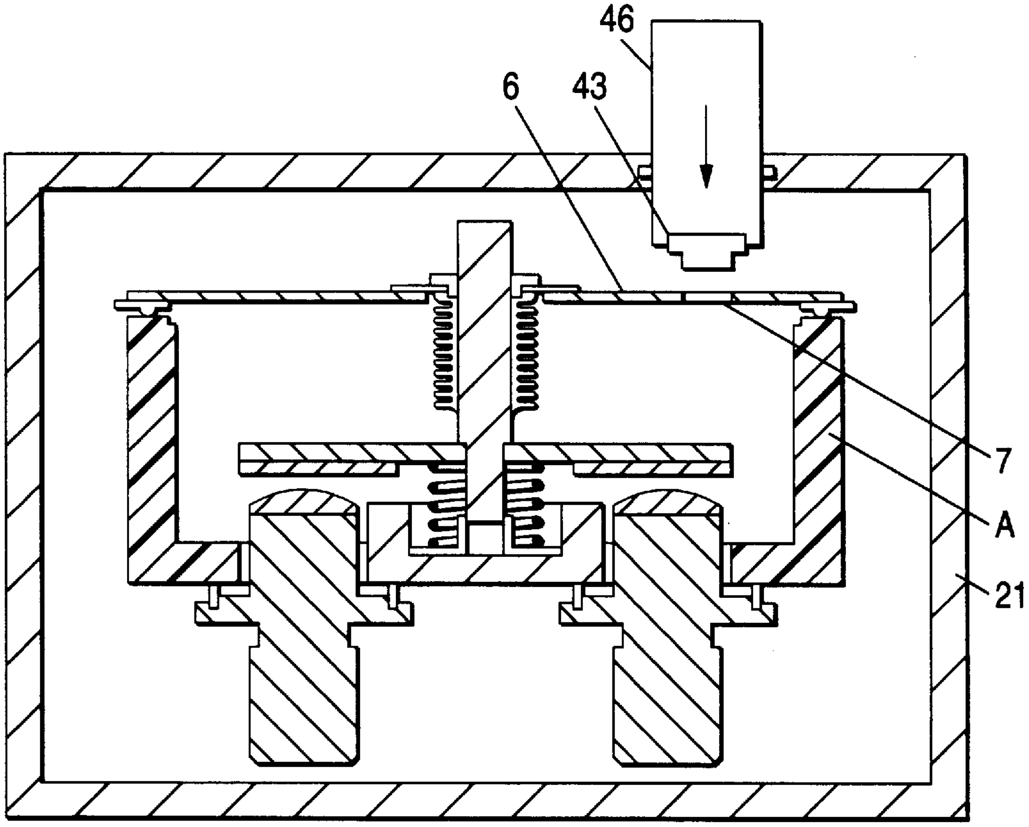
FIGS. 31*a* and 31*b* are section views showing sealing of a vent hole in an embodiment of a thirtieth aspect of the invention.
Figure 31B:
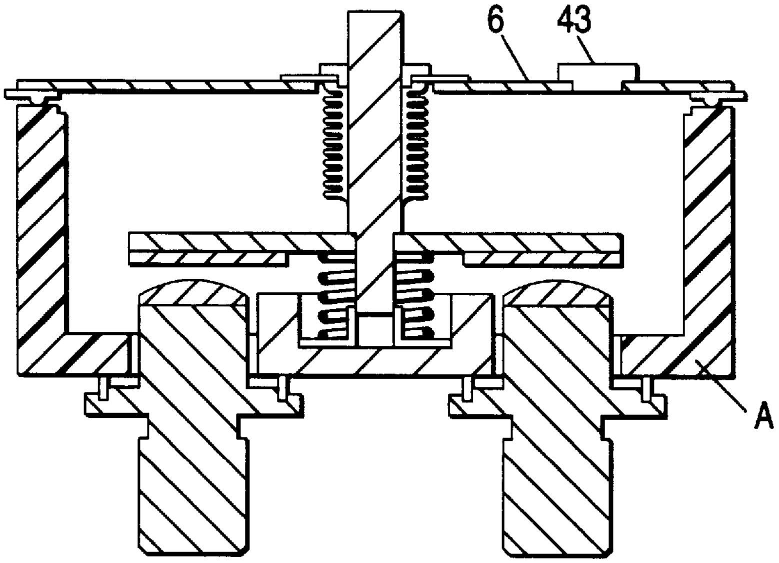

FIGS. 31*a* and 31*b* show an embodiment according to the thirtieth aspect of the invention. The basic configuration of the embodiment is identical with that of Embodiment 1. The identical components are designated by the same reference numerals, and their description is omitted. Hereinafter, only the formation of a vent hole 7 and a device for sealing the hole which are features of the embodiment will be described.

Referring to FIG. 31*a*, a plug 43 held by a plug holder 46 is positioned immediately above the vent hole 7 of a metal lid 6. After evacuation or gas introduction is conducted via the vent hole 7 of the metal lid 6, the plug holder 46 is lowered and the plug 43 is inserted into the vent hole 7. At this time, the relationship between the vent hole 7 and the plug 43 is only in the state where the plug is mechanically pressingly inserted into the hole and gastightness cannot be maintained for a long time. Under this state, however, the condition of the interior of the sealed contact device A can be maintained for a short time at a degree where the performance of the device is not impaired. Therefore, the sealed contact device A is taken out from the chamber 21, and the plug 43 is then welded without a long lapse of time to the metal lid 6 by using, for example, laser, as shown in FIG. 31*b*, thereby ensuring complete gastightness.

According to the embodiment, it is not required to conduct works such as those of supplying and applying a brazing material in the chamber 21 for evacuation and gas introduction, and hence it is possible to provide a method which is safe and has a high productivity in gastight sealing.

Embodiment 26

FIGS. 32*a* to 32*d* show an embodiment according to the thirty-first aspect of the invention. The basic configuration of the embodiment is identical with that of Embodiment 1. The identical components are designated by the same reference numerals, and their description is omitted.

Hereinafter, only the method of sealing a vent hole which is a feature of the embodiment will be described.

Figure 32A:
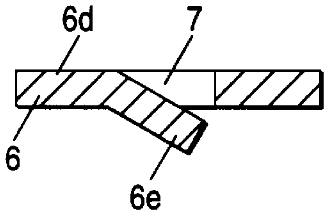
FIGS. 32*a* to 32*d* show an embodiment according to a thirty-first aspect of the invention.
Figure 32B:
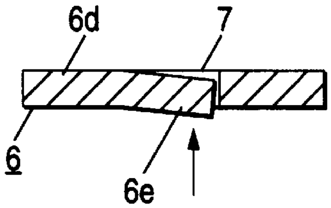
Figure 32C:
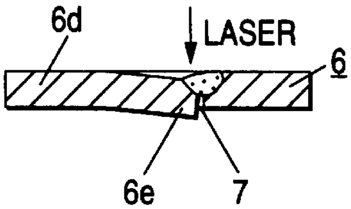
Figure 32D:
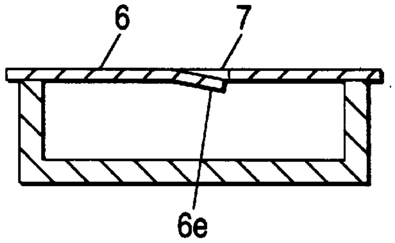

In order to improve the air permeability, a raised piece 6*e* is formed in a metal plate 6*d* with forming a gap of, for example, 0.2 mm or more, as shown in FIG. 32*a*. After a ventilation operation such as evacuation is conducted, for example, the raised piece 6*e* is mechanically plastic-deformed to reduce the gap to 0.1 mm or less, so that the vent hole 7 is closed, as shown in FIG. 32*b*. Thereafter, the periphery of the hole of the reduced size is melted by heating by, for example, laser irradiation. The gap is closed by the molten metal, thereby sealing the hole, as shown in FIG. 32*c*.

According to the method, the raised piece 6*e* provides a high air ventilation ability, and the hole can be easily sealed by melting with returning the raised piece 6*e* to its original position. Since the vent hole 7 cannot be seen from the raised piece 6*e* in the heat melting direction (in a direction perpendicular to the face of the metal plate), the hole can be easily sealed.

Embodiment 27

FIGS. 33*a* to 33*d* show an embodiment according to the thirty-second aspect of the invention. The basic configuration of the embodiment is identical with that of Embodiments 1 and 26. The identical components are designated by the same reference numerals, and their description is omitted. Hereinafter, only the formation of a vent hole 7 and a device for sealing the hole which are features of the embodiment will be described.

Figure 33A:
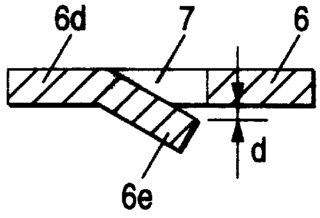
FIGS. 33*a* to 33*d* show an embodiment according to a thirty-second aspect of the invention.
Figure 33B:
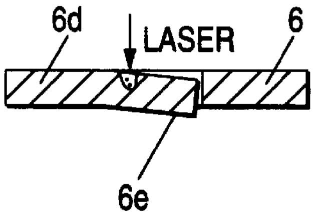
Figure 33C:
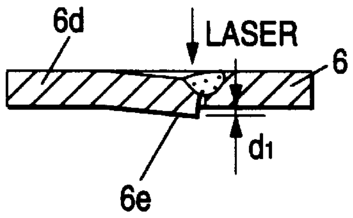
Figure 33D:
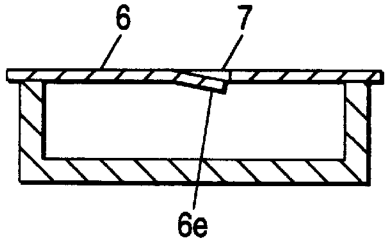

In order to improve the air permeability, a raised piece 6*e* is formed in a metal plate 6*d* with forming a gap of, for example, 0.2 mm or more, as shown in FIG. 33*a*. After a ventilation operation such as evacuation is conducted, the root portion of the raised piece 6*e* is locally heated by laser irradiation, with the result that the raised piece 6*e* is deformed by heat contraction. The deformation is continued until the gap d of the raised piece 6*e* is reduced to 0.1 mm or less, so that the vent hole 7 is closed, as shown in FIG. 33*b*. Thereafter, the periphery of the gap of the reduced size is melted by heating by means of, for example, laser irradiation. The gap is closed by the molten metal, thereby sealing the hole, as shown in FIG. 33*c*.

According to the embodiment, the vent hole 7 is formed by a raised portion. During gas supply and exhaust, therefore, a large opening area can be ensured, and hence the time required for gas supply and exhaust can be shortened. Since the raised piece 6*e* is deformed by using a heat source such as a laser apparatus, the handling of the device can be conducted without contacting with the metal lid 6. Consequently, the method is very convenient for the use in the chamber 21 and 33 of a vacuum or gas ambient. The configuration in which the gap is reduced in size by using a heat source such as a laser apparatus allows the gastight sealing operation to be easily conducted without using an additional member.

Embodiment 28

FIGS. 34*a* to 34*d* show an embodiment according to the thirty-third aspect of the invention. The basic configuration of the embodiment is identical with that of Embodiments 1 and 17. The identical components are designated by the same reference numerals, and their description is omitted.

Hereinafter, only the formation of a vent hole 7 and a device for sealing the hole which are features of the embodiment will be described.

Figure 34A:
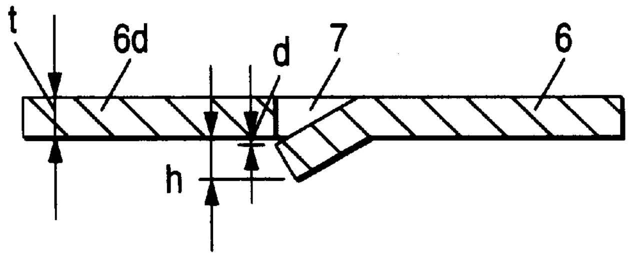
FIGS. 34*a* to 34*d* show formation and sealing of a vent hole in an embodiment of a thirty-third aspect of the invention.
Figure 34B:
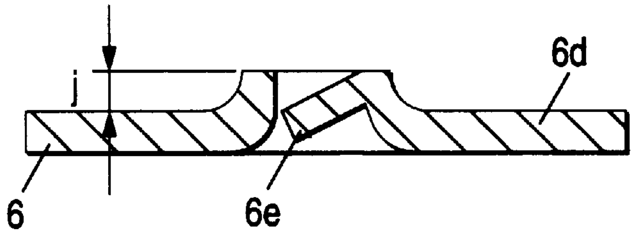
Figure 34C:
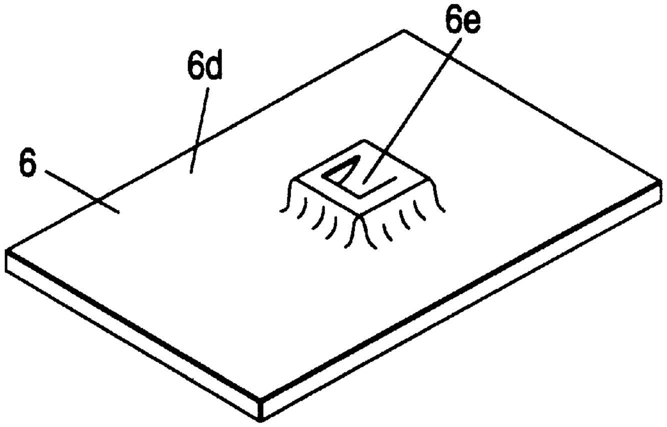
Figure 34D:
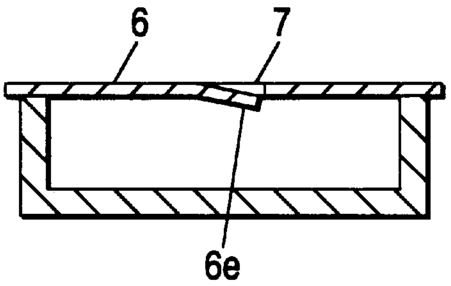
Figure 35:
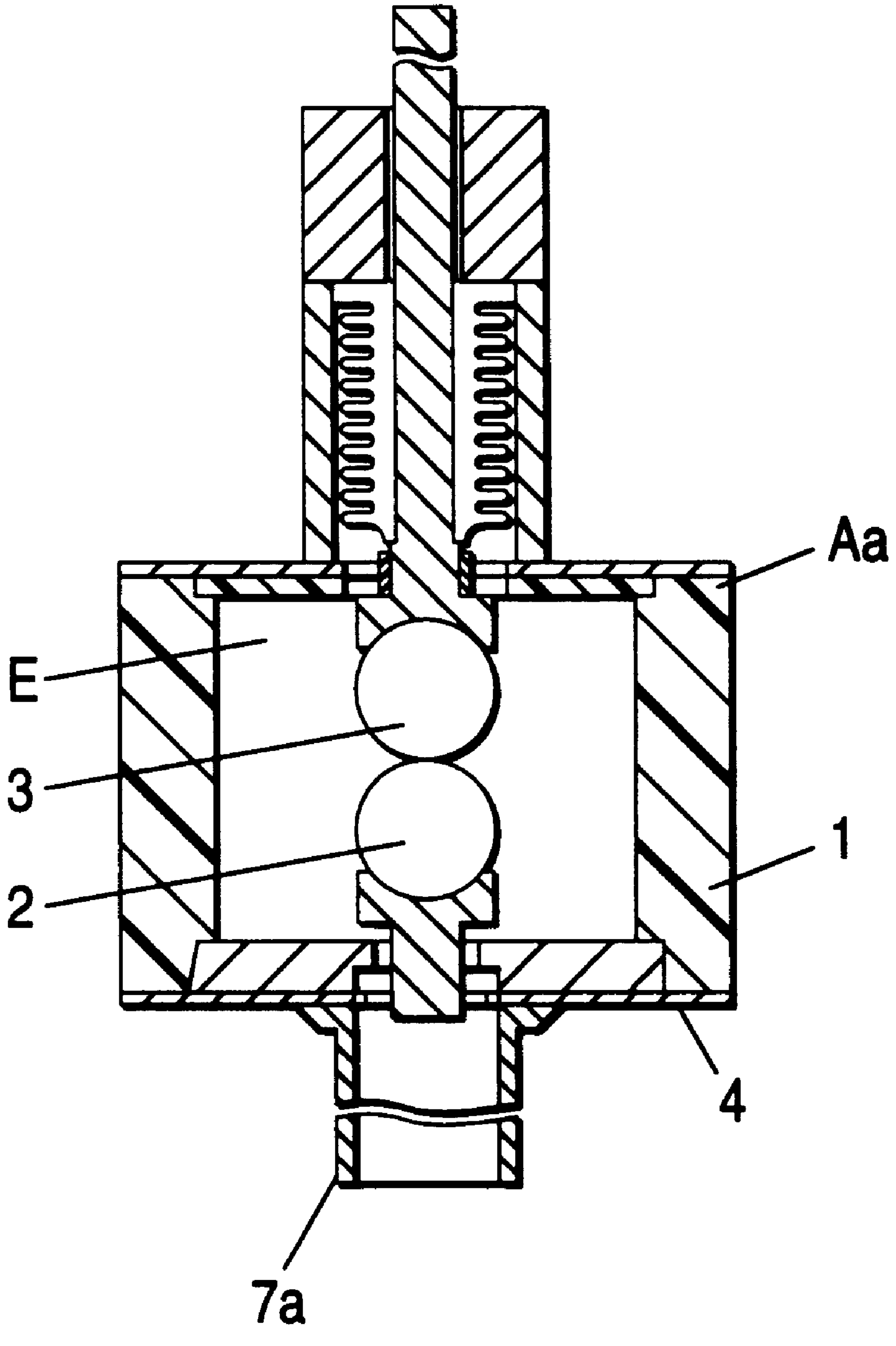
FIG. 35 is a section view of a conventional example.

First, as shown in FIG. 34*a*, a raised piece 6*e* (the gap d is 0.2 mm) is formed in a metal plate 6*d* of a thickness t of 0.5 mm, so that an inward raised height h is 0.7 mm. At this time, as shown in FIGS. 34*b* to 34*d*, the metal portion in the periphery of the raised piece 6*e* is projected toward the outside of the container by plastic-deformation so as to have a raised height j of 0.7 mm.

According to the embodiment, the raised piece 6*e* is not projected from the lower face of a metal plate 6*d*. When another part exists below the metal plate 6*d*, for example, the raised piece is prevented from interfering with the part. The deformed portion which is projected functions as a rib so as to prevent the periphery from being deformed by welding distortion.

According to the first aspect of the invention, in a sealed contact device in which a stationary contact and a movable contact are disposed in a housing having a gastight space, a metal lid is joined in a gastight manner to an opening end of a container body, the housing including the container body made of ceramics, a vent hole is formed in the metal lid, and the vent hole is sealed. Therefore, the invention has an advantage that the vent hole is sealed and there is no member projected from the metal lid, thereby producing an advantage that the configuration for forming the gastight space is prevented from being projected from the housing. Furthermore, the vent hole is formed in the metal lid, and hence the flat metal lid can be effectively used.

According to the second aspect of the invention, in a sealed contact device in which a stationary contact and a movable contact are disposed in a housing having a gastight space, a vent hole is formed in an electrode, the stationary contact being disposed on the electrode, the electrode being extended to an outside of the housing, and the vent hole is sealed. Therefore, the invention has an advantage that the vent hole is sealed and there is no member projected from the metal lid, and hence the configuration for forming the gastight space is prevented from being projected from the housing. Furthermore, the vent hole is formed in the electrode, and hence the electrode can be effectively used.

According to the third aspect of the invention, in a sealed contact device in which a stationary contact and a movable contact are disposed in a housing having a gastight space, the device includes a movable shaft, the movable contact being disposed on the movable shaft, the movable shaft being extended to an outside of the housing and movable, a vent hole is formed in the movable shaft, and the vent hole is sealed. Therefore, the invention has an advantage that the vent hole is sealed and there is no member projected from the metal lid, and hence the configuration for forming the gastight space is prevented from being projected from the housing. Furthermore, the vent hole is formed in the movable shaft, and hence the movable shaft can be effectively used.

According to the fourth aspect of the invention, in a sealed contact device in which a stationary contact and a movable contact are disposed in a housing having a gastight space, a vent hole is formed in a container body, the housing including the container body made of ceramics, and the vent hole is sealed. Therefore, the invention has an advantage that the vent hole is sealed and there is no member projected from the metal lid, and hence the configuration for forming the gastight space is prevented from being projected from the housing. Furthermore, the vent hole is formed in the container body, and hence the container body can be effectively used.

According to the fifth aspect of the invention, the sealed contact device of the first aspect of the invention is configured so that a metal portion of the opening end of the container body, and the metal lid are made of a metal material which is similar in coefficient of linear expansion to the container body. When a metal material of a small coefficient of linear expansion, such as 42-alloy is used in a metal portion such as an upper flange, therefore, the difference in coefficient of linear expansion between the metal portion and the container body is small, and hence crack, deformation, and the like due to thermal effects in brazing can be reduced. The invention has an advantage that, when a material (for example, 42-alloy) which is similar in coefficient of linear expansion to a metal portion such as the container body and the upper flange is used in the metal lid, the gastight joint between a metal portion such as the upper flange and the metal lid can be easily realized.

According to the sixth aspect of the invention, in a method of producing a sealed contact device in which a stationary contact and a movable contact are disposed in a housing having a gastight space, a metal lid is joined in a gastight manner to an opening end of a container body, the housing including the container body made of ceramics, a vent hole is formed in the metal lid, a gas is supplied and exhausted via the vent hole, and a periphery of the hole is then melted and the vent hole is closed by a molten metal, thereby sealing the hole. Therefore, the invention has an advantage that the vent hole of the metal lid is sealed by melting the hole itself, and hence no special part for sealing is required.

According to the seventh aspect of the invention, in a method of producing a sealed contact device in which a stationary contact and a movable contact are disposed in a housing having a gastight space, a vent hole is formed in an electrode, the stationary contact being disposed on the electrode, the electrode being extended to an outside of the housing, a gas is supplied and exhausted via the vent hole, and a periphery of the hole is then melted and the vent hole is closed by a molten metal, thereby sealing the hole. Therefore, the invention has an advantage that the vent hole of the electrode is sealed by melting the hole itself, and hence no special part for sealing is required.

According to the eighth aspect of the invention, in a method of producing a sealed contact device in which a stationary contact and a movable contact are disposed in a housing having a gastight space, the device includes a movable shaft, the movable contact being disposed on the movable shaft, the movable shaft being extended to an outside of the housing and movable, a vent hole is formed in the movable shaft, a gas is supplied and exhausted via the vent hole, and a periphery of the hole is then melted and the vent hole is closed by a molten metal, thereby sealing the hole. Therefore, the invention has an advantage that the vent hole of the electrode is sealed by melting the hole itself, and hence no special part for sealing is required.

According to the ninth aspect of the invention, in a method of producing a sealed contact device in which a stationary contact and a movable contact are disposed in a housing having a gastight space, a metal lid is joined in a gastight manner to an opening end of a container body, the housing including the container body made of ceramics, a vent hole is formed in the metal lid, a further metal member having no hole is attached to the vent hole, and the metal member is melted to close the vent hole, thereby sealing the hole. Therefore, the invention has an advantage that, even when the vent hole which is and used for supplying or exhausting a gas is relatively large, gastight sealing can be easily realized, and hence the time required for evacuation can be shortened and the productivity of the gastight sealing step can be improved.

According to the tenth aspect of the invention, in a method of producing a sealed contact device in which a stationary contact and a movable contact are disposed in a housing having a gastight space, a vent hole is formed in an electrode, the stationary contact being disposed on the electrode, the electrode being extended to an outside of the housing, a further metal member having no hole is attached to the vent hole, and the metal member is melted to close the vent hole, thereby sealing the hole. Therefore, the invention has an advantage that, even when the vent hole which is used for supplying or exhausting a gas is relatively large, gastight sealing can be easily realized, and hence the time required for evacuation can be shortened and the productivity of the gastight sealing step can be improved.

According to the eleventh aspect of the invention, in a method of producing a sealed contact device in which a stationary contact and a movable contact are disposed in a housing having a gastight space, the device includes a movable shaft, the movable contact being disposed on the movable shaft, the movable shaft being extended to an outside of the housing and movable, a vent hole is formed in the movable shaft, a further metal member having no hole is attached to the vent hole, and the metal member is melted to close the vent hole, thereby sealing the hole. Therefore, the invention has an advantage that, even when the vent hole which is used for supplying or exhausting a gas is relatively large, gastight sealing can be easily realized, and hence the time required for evacuation can be shortened and the productivity of the gastight sealing step can be improved.

According to the twelfth aspect of the invention, in a method of producing a sealed contact device in which a stationary contact and a movable contact are disposed in a housing having a gastight space, a vent hole is formed in a container body, the housing including the container body made of ceramics, a further metal member having no hole is attached to the vent hole, and the metal member is melted to close the vent hole, thereby sealing the hole. Therefore, the invention has an advantage that, even when the vent hole which is used for supplying or exhausting a gas is relatively large, gastight sealing can be easily realized, and hence the time required for evacuation can be shortened and the productivity of the gastight sealing step can be improved.

According to the thirteenth aspect of the invention, the method of producing a sealed contact device of any one of the sixth to eighth aspects of the invention is configured so that a projection is formed by a working method which is not a removal working method, to form the vent hole, a gas is supplied and exhausted via the vent hole, and the projection in the vicinity of the hole is then melted and the vent hole is closed by a molten metal, thereby sealing the hole. Therefore, the invention has an advantage that the projection of the vent hole is melted by heating, and hence padding can be sufficiently formed and the invention is advantageous for gastight sealing.

According to the fourteenth aspect of the invention, the method of producing a sealed contact device of any one of the sixth to eighth aspects of the invention is configured so that a raised piece is deformed to close the vent hole, and a periphery of the hole which has been reduced in size is then melted by heating, thereby sealing the hole. Therefore, the invention has advantages that, since the vent hole is formed by the raised piece, a large opening section area can be ensured during evacuation and gas introduction, and hence the time required for evacuation and gas introduction can be shortened, and that, since the gap can be reduced in size by, for example, mechanically plastic-deforming the raised piece, the metal in the periphery of the vent hole can be melted by using a heat source such as a laser apparatus, with the result that the welding can be conducted so as to form a gastight configuration without additionally using a metal member.

According to the fifteenth aspect of the invention, the method of producing a sealed contact device of the fourteenth aspect of the invention is configured so that the raised piece is formed on an inner side of the container body, thereby forming the vent hole, a gas is supplied and exhausted, a root portion of the raised piece is locally heated to deform a part of the raised piece to close the vent hole, and a remaining portion of a periphery of the hole is then melted by heating, thereby sealing the hole. Therefore, the invention has advantages that, since the vent hole is formed by the raised piece, a large opening section area can be ensured during evacuation and gas introduction, and hence the time required for evacuation and gas introduction can be shortened, that the raised piece can be deformed in a noncontact manner by, for example, laser irradiation so as to reduce the size of the gap, and that the metal in the periphery of the hole can be melted by using a heat source such as a laser apparatus so as to form a gastight configuration without additionally using a metal.

According to the sixteenth aspect of the invention, the method of producing a sealed contact device of the fifteenth aspect of the invention is configured so that a parallel portion which is substantially parallel with the metal lid is formed in the raised piece, and the parallel portion is pressed to make the parallel portion thinner than another portion of the raised piece, whereby a width of the parallel portion is increased to form an overlapping portion when the raised piece is returned to an original position. The raised piece is pressed by, for example, a pressing machine so that the thickness is reduced and the width is increased to form the overlapping portion. When the root portion of the raised piece is locally heated by, for example, laser irradiation and contraction of the locally heated portion during cooling causes the raised piece to be deformed so as to reduce the size of a gap, the overlapping portion overlaps with the metal lid. Therefore, the invention has an advantage that the welding for forming a gastight configuration can be easily conducted and the reliability of the welding is enhanced.

According to the seventeenth aspect of the invention, the method of producing a sealed contact device of the fifteenth aspect of the invention is configured so that, in order to reduce a degree of projection of the raised piece directed toward an inner side of the container body, a periphery of the hole where the raised piece is formed is projected toward an outside of the container body. Therefore, the raised piece is not projected from the lower face of a metal plate. When another part exists below the metal plate, for example, the raised piece is prevented from interfering with the part. Furthermore, the invention has an advantage that the deformed portion which is projected functions as a rib so as to prevent the periphery from being deformed by welding distortion.

According to the eighteenth aspect of the invention, the method of producing a sealed contact device of any one of the sixth to eighth aspects of the invention is configured so that the vent hole is formed in a slanting direction with respect to a thickness direction of the metal lid, and a periphery of the vent hole is welded, thereby sealing the hole. The vent hole slantingly passes through the metal lid. Therefore, the invention has an advantage that, even when irradiation from a heat source such as a laser apparatus is perpendicularly applied to the metal lid, gastight sealing can be easily realized.

According to the nineteenth aspect of the invention, the method of producing a sealed contact device of any one of the sixth to eighth aspects of the invention is configured so that a peripheral portion of the vent hole is thinned, a gas is supplied and exhausted via the vent hole, and a periphery of the vent hole is then melted by heating, thereby sealing the hole. Therefore, the invention has an advantage that the reduced thickness of the peripheral portion of the vent hole lowers the resistance exerted on air passing through the vent hole, and hence the interior of the container body can be easily evacuated and the time required for evacuation can be shortened.

According to the twentieth aspect of the invention, the method of producing a sealed contact device of any one of the sixth to eighth aspects of the invention is configured so that the vent hole is formed by leaving a part of a portion where a metal portion of the opening end of the container body and the metal lid are to be joined to each other, as a slit-like shape, a gas is supplied and exhausted via the vent hole, and a periphery of the vent hole is then melted by heating along the slit-like shape, thereby sealing the hole. Therefore, it is not necessary to form a hole in the metal lid and hence the step of forming a hole can be reduced. Furthermore, the invention has an advantage that, in the sealing step, it is possible to employ a process similar to that which is conducted in the previous step of joining the upper flange to the whole periphery of the metal lid.

According to the twenty-first aspect of the invention, the method of producing a sealed contact device of any one of the sixth to eighth aspects of the invention is configured so that the vent hole is formed by forming many pores in the metal lid, a gas is supplied and exhausted via the vent hole, and the pores are then melted by heating, thereby sealing the hole. Since many pores are used, the invention has an advantage that the vent hole can be easily sealed in a gastight manner after the operation of supplying and exhausting a gas and the reliability of the sealing is enhanced.

According to the twenty-second aspect of the invention, the method of producing a sealed contact device of the twenty-first aspect of the invention is configured so that a plug part having many grooves on a peripheral wall is inserted into an opening of the metal lid, the grooves cooperating with the metal lid to form the pores, thereby forming the vent hole, a gas is supplied and exhausted via the vent hole, and the plug part is then melted by heating to be welded to the metal lid, thereby sealing the hole. As compared with the process of forming pores in the metal lid, therefore, the method can obtain the minute vent hole more easily and economically. When the grooves are arranged along the outer circumference of the plug part which is substantially conical, the plug part can be melted by heating with moving a heat source in a circle. Consequently, gastight sealing can be easily conducted.

According to the twenty-third aspect of the invention, the method of producing a sealed contact device of any one of the sixth to eighth aspects of the invention is configured so that the sealed contact device is housed in a chamber, a gas is supplied to and exhausted from an interior of the chamber, and the vent hole is then sealed. Therefore, the invention has an advantage that, since the sealed contact device is placed in a chamber, the fear that explosion due to mixture of a gas and air may occur during laser irradiation can be eliminated and hence the method is safer.

According to the twenty-fourth aspect of the invention, the method of producing a sealed contact device of any one of the sixth to eighth aspects of the invention is configured so that a port member is detachably attached in a gastight manner to the metal lid in which the vent hole is formed, a gas is supplied and exhausted via the port member, and the vent hole is then sealed. Since gas supply and exhaust are conducted via the port member, the evacuation region can be made smaller. Therefore, the invention has an advantage that the time required for evacuation can be shortened and the productivity of the gastight sealing step can be improved.

According to the twenty-fifth aspect of the invention, the method of producing a sealed contact device of any one of the ninth to twelfth aspects of the invention is configured-so that the vent hole is sealed in a gastight manner by a metal member having a shape which allows the metal member to be fitted into the vent hole. Therefore, the invention has an advantage that the metal lid can be easily positioned with respect to the vent hole, and also the welding operation can be easily conducted.

According to the twenty-sixth aspect of the invention, the method of producing a sealed contact device of the twenty-fifth aspect of the invention is configured so that a projection in which a gap or groove is formed is formed on a plug, one end portion of the projection of the plug is fitted into the vent hole formed in the metal lid, thereby allowing the vent hole to remain in a periphery of the gap or groove,. evacuation is conducted or a gas is filled via the vent hole, and the vent hole is sealed by heating. Therefore, the metal lid and the plug can be provisionally fixed to each other in advance. The subsequent steps do not require works of supplying, chucking, and positioning of the plug, and the like, and require only relatively simple works of pressingly inserting the plug and then welding it. Therefore, the invention has an advantage that the steps can be easily performed even in, for example, a chamber for gas introduction, and the productivity can be enhanced.

According to the twenty-seventh aspect of the invention, the method of producing a sealed contact device of any one of the ninth to twelfth aspects of the invention is configured so that a projection is formed on a rear face of a plug, one end portion of the projection of the plug is placed on an edge portion of an opening which is formed in the metal lid, the plug is fixed to an edge portion of the opening on a side which is opposite to a side where the projection is placed, thereby forming the vent hole in a portion of the opening between the plug and the metal lid, evacuation is conducted or a gas is filled via the vent hole, and a portion of the projection which is placed on the metal lid is melted by heating, whereby the plug is caused to abut against a peripheral portion of the opening and to be welded by heating to the metal lid. Therefore, the metal lid and the plug can be provisionally fixed in advance with ensuring a gap therebetween. The subsequent steps do not involve works such as those of supplying, chucking, and positioning of the plug and require only noncontact works for conducting laser welding. Therefore, the invention has an advantage that the steps can be easily performed even in, for example, a chamber for gas introduction, and the productivity can be enhanced.

According to the twenty-eighth aspect of the invention, the method of producing a sealed contact device of any one of the ninth to twelfth aspects of the invention is configured so that plural plugs are separably connected via separation pieces, the vent hole of the metal lid is sealed by one of the plugs, and, at the same time with or after this sealing, the plug is separated from other plugs at corresponding one of the separation pieces. Therefore, the invention has an advantage that the plugs are, continuously supplied and the productivity of the gastight sealing step can be enhanced.

According to the twenty-ninth aspect of the invention, the method of producing a sealed contact device of any one of the ninth to twelfth aspects of the invention is configured so that a brazing material is deposited on at least one of a periphery of the vent hole of the metal lid and a surface of a plug, and, after gas supply and exhaust or gas introduction via the vent hole, the metal lid and the plug are closely contacted to each other and heated to a temperature which is equal to or higher than a melting point of the brazing material, thereby sealing the hole by brazing. Therefore, it is not required to conduct works such as those of supplying and applying a brazing material in the chamber for evacuation and gas introduction. Unlike the case where welding is conducted, the operation of positioning the plug and the heating portion does not require high accuracy. Therefore, the invention has an advantage that the productivity of the gastight sealing step can be enhanced.

According to the thirtieth aspect of the invention, the method of producing a sealed contact device of any one of the ninth to twelfth aspects of the invention is configured so that a plug is provisionally fixed in a chamber to a degree at which gastightness can be maintained for a short time, the chamber being able to be subjected to evacuation, gas introduction, or the like, the device is then taken out from the chamber, and the plug is welded in a gastight manner. Therefore, the invention has an advantage that, since it is not required to conduct works such as those of supplying and applying a brazing material in the chamber for evacuation and gas introduction, the safety and productivity of the gastight sealing step can be enhanced.

According to the thirty-first aspect of the invention, in a method of sealing a vent hole which is formed in a metal plate, a raised piece is deformed to close the vent hole, and a periphery of the hole which has been reduced in size is then melted by heating, thereby sealing the hole. Therefore, the raised piece which is raised up provides a high air permeability, and, when the raised piece is returned to its original position, the vent hole can be easily sealed by melting by using the raised piece. The vent hole cannot be seen from the raised piece in the heat melting direction. Also this configuration produces an advantage that the melt sealing operation is facilitated.

According to the thirty-second aspect of the invention, the method of the thirty-first aspect is configured so that a root portion of the raised piece is locally heated to deform a portion of the raised piece by thermal distortion to close the vent hole, and a remaining portion of a periphery of the hole is then melted by heating, thereby sealing the hole. Since the vent hole is formed by a raised portion, a large opening area can be ensured during gas supply and exhaust, and hence the time required for gas supply and exhaust can be shortened. Since the raised piece is deformed by using a heat source such as a laser apparatus, the handling of the device can be conducted without contacting with the metal lid. Consequently, the method is very convenient for the use in a chamber of a vacuum or gas ambient. The configuration in which the gap is reduced in size by using a heat source such as a laser apparatus produces an advantage that the gastight sealing operation can be easily conducted without using an additional member.

According to the thirty-third aspect of the invention, the method of the thirty-second aspect is configured so that a metal portion in a periphery of the raised piece is upward projected. Therefore, the raised piece is not projected from the lower face of a metal plate.- When another part exists below the metal plate, for example, the raised piece is prevented from interfering with the part. Furthermore,.the invention has an advantage that the deformed portion which is projected functions as a rib so as to prevent the periphery from being deformed by welding distortion.

What is claimed is:

1. A method of sealing a hole, comprising the steps of:

providing a piece of metal plate;

forming a raised piece on said metal plate to form said hole in said metal plate;

deforming said raised piece to close said hole; and sealing said hole by melting a periphery of said hole by heating.

2. The method of sealing a hole of claim 1, wherein said deforming step includes a step of heating locally a root portion of said raised piece to deform a portion of said raised piece by thermal distortion to close said hole.

3. The method of sealing a hole of claim 2, wherein said sealing step includes a step of heating a remaining portion of the periphery of said hole to melt the remaining portion.

4. A method of sealing a hole according to claim 3, wherein a metal portion in a periphery of said raised piece is upwardly projected.

* * * * *